United States Patent [19]
Okazaki et al.

[11] Patent Number: 5,383,052
[45] Date of Patent: Jan. 17, 1995

[54] AFOCAL OPTICAL SYSTEM AND MULTIBEAM RECORDING APPARATUS COMPRISING THE SAME

[75] Inventors: Masahide Okazaki; Kenji Ueyama; Takahisa Hayashi, all of Kyoto, Japan

[73] Assignee: Dainippon Screen Mfg. Co., Ltd., Japan

[21] Appl. No.: 65,866

[22] Filed: May 21, 1993

[30] Foreign Application Priority Data

May 27, 1992 [JP] Japan .................................. 4-162202
May 27, 1992 [JP] Japan .................................. 4-162209

[51] Int. Cl.⁶ ...................... G02B 17/06; G02B 26/10
[52] U.S. Cl. ........................ 359/364; 359/363; 359/365; 359/366; 359/204; 359/44.27; 346/108
[58] Field of Search ............... 359/362, 363, 364, 365, 359/365, 366, 204; 369/44.37, 44.38; 346/108; 350/624, 629

[56] References Cited

U.S. PATENT DOCUMENTS

| | | | |
|---|---|---|---|
| 4,623,223 | 11/1986 | Kempf | 350/138 |
| 5,173,801 | 12/1992 | Cook | 359/365 |
| 5,291,329 | 3/1994 | Wakimoto et al. | 359/362 |

OTHER PUBLICATIONS

Bonn, Max and Emil Wolf, Tokai University Publishing Society, "Principles of Optics I", 6.4 Reflecting Telescope, Oct. 25, 1974, pp. 332–333.

Primary Examiner—Viet Q. Nguyen
Attorney, Agent, or Firm—Ostrolenk, Faber, Gerb & Soffen

[57] ABSTRACT

An afocal optical system is formed by a paraboroid mirror and an optical element having a stereographic projection characteristics which is defined by the following equation:

$$hi' = 2 \cdot f \cdot \tan(\theta i/2)$$

where $hi'$ is a height of a light beam, leaving the optical element, taken from the optical axis or a heigh of an image taken from the optical axis, f is a focal length of the optical element and $\theta i$ is an angle of incidence with respect to the optical element. The focal point of the optical element coincide with that of the first paraboroid mirror. Thus, a compact afocal optical system which satisfies $hi' = m \cdot hi$ is manufactured at low costs.

10 Claims, 26 Drawing Sheets

AFOCAL OPTICAL SYSTEM AND MULTIBEAM RECORDING APPARATUS COMPRISING THE SAME

BACKGROUND OF THE INVENTION

1. Field of the Invention

The present invention relates to an afocal optical system in which focal points of optical elements each having a finite focal length coincide with each other at a predetermined point. The present invention also relates to a multibeam recording apparatus comprising the afocal optical system.

2. Description of the Background Art

FIG. 1 is a diagram of a conventional afocal optical system which is known in the art as a Keplerian type beam expander. The beam expander is comprised of two positive power lenses L31 and L32 which are spaced away from each other by a distance (f31+f32), where f31 is a focal length of the lens L31 and f32 is a focal length of the lens L32. The focal point of the lens L31 and the focal point of the lens L32 coincide with each other at a predetermined point A. Hence, a light beam LB1 parallel to the optical axis Z entering the beam expander would be converted into a light beam LB3 which leaves the beam expander parallel to the optical axis Z, the light beam LB3 satisfying:

$$hi' = m1 \cdot hi$$
$$= (f32/f31) \cdot hi$$

where hi is a height of the incident light beam LB1 taken from the optical axis Z; hi' is a height of the leaving light beam LB3 taken from the optical axis Z; and m is a magnification of the beam expander.

FIG. 2 is a diagram showing other example of a conventional afocal optical system and illustrates the relationship between an object 202 and an image 204. The afocal optical system is comprised of a lens L41 having a focal length f41 and a lens L42 having a focal length f42, which are disposed a distance (f41+f42) away from each other. The image of the object 202 placed the distance f41 in front of (on the left side of) the lens L41 is obtained at a point the distance f42 behind (on the right side of) the lens L42.

The beam expander of FIG. 1 needs to comprise a larger lens L32 if the increase in diameter of light beam LB3 is desired. Likewise, the both side telecentric optical system of FIG. 2, which is telecentric on both the image and the object sides, needs to comprise a larger lens L42 if a larger image 204 is desired.

When reduction in size of these optical systems (shortened optical path) is desired, one of the approaches to attain is to shorten the focal length f32 of the lens L32, for example. However, such would result in reduction in the F-number of the optical system, which in turn would require an increased number of lenses to be used to achieve an optical system which is capable of carrying out the same optical performance as the optical system of FIG. 1. Thus, although the optical path is shortened, the number of lenses which form the optical system is increased, and hence, the manufacturing cost and the weight of the optical system are increased.

Conversely, if the optical system is formed by less lenses to place priority on the number of the lenses to form the optical system, the optical performances of the optical system would be deteriorated, creating various aberrations. Since the optical system can no longer satisfy the relation hi'=m·hi due to the aberrations, the optical system is not reliable enough to be applied to an optical apparatus such as a beam expander and a multibeam recording apparatus.

When the optical system can not satisfy the relation hi'=m·hi, chances are that even if the light beam LB1 impinging upon the afocal optical system is parallel to the optical axis Z, the light beam LB3 leaving the optical system is not parallel to the optical axis Z. In such likely case, if the optical system is used in an apparatus which requires a telecentric characteristic especially on the imaging side, an image would be distorted.

FIG. 3 is a diagram of a conventional multibeam recording apparatus. In FIG. 3, the multibeam recording apparatus comprises a plurality of light source parts which are arranged at equal intervals (only one light source part 12 is shown in FIG. 3), a reduction optical system 200 which is formed by lenses L20 and L21, a zoom lens 32 which is formed by lenses L22 to L24, and an afocal optical system 34 which is formed by lenses L25 and L26.

The light source part 12 includes a semiconductor laser 14. A laser beam from the semiconductor laser 14 is collimated by a collimating lens 16, and then pass through an aperture 18 to be allowed to the reduction optical system 200 parallel to the optical axis Z. The reduction optical system 200 has the same structure as that of the conventional afocal optical system of FIG. 2. That is, as shown in FIG. 3, the rear focal point of the lens L20 coincides with the front focal point of the lens L21, and therefore, the reduction optical system 200 is an afocal optical system. The laser beams from the reduction optical system 200 are magnified at a proper magnification by the zoom lens 32, focused by the afocal optical system 34 at the focal plane FP3 of the afocal optical system 34, and irradiated onto a recording surface RS which is disposed at the focal plane FP3 of the afocal optical system 34. Since principal rays of the laser beams are each perpendicular to the focal plane FP3, a magnification does not change even when a distance between the focal plane FP3 and the recording surface RS is changed. Thus, highly accurate image drawing is attainable.

Laser beams from the other light source parts which are not shown are irradiated onto the recording surface RS in a similar manner so that a plurality of beam spots are formed at the same time on the recording surface RS.

Constructed as above, the conventional multibeam recording apparatus needs a larger lens in order to increase the number of the beam spots which are formed on the recording surface RS at one time, i.e., the number of the channels. As can be understood from FIG. 3, to obtain more channels, more light source parts 12 disposed in a direction perpendicular to the optical axis Z are necessary, and therefore, the lens L20 must be enlarged accordingly at the expense of deteriorated aberration at the lens L20 and increased costs for manufacturing the lens L20.

On the other hand, to obtain a smaller multibeam recording apparatus by reducing the size of the optical system of FIG. 3, the focal length f0 of the lens L20 and hence the optical path must be shortened. However, when the focal length f0 is reduced, the F-number of the optical system will become smaller. In such a case, an increased number of lenses must be used to ensure the same optical performance which are obtainable from the optical system of FIG. 3. As a result, although the optical path is shortened, the number of the lenses which form the optical system, and hence, the manufacturing costs and the weight of the optical system are increased.

Conversely, if the optical system is formed by less lenses to place priority on the number of the lenses to form the optical system, the optical performances of the optical system would be deteriorated, creating various aberrations. Hence, although the light source parts 12 are arranged equidistant from each other, spacings between adjacent beam spots which are irradiated through the optical system onto the recording surface RS, that is, the beam pitches, will become uneven or the configurations of the beam spots will be deformed. Further, since the principal rays of the laser beams striking the focal plane FP3 are not perpendicular to the focal plane FP3, with a change in a distance between the focal plane FP3 and the recording surface RS, the magnification of the optical system (beam pitches) will be changed. A result of this is degraded quality of a recorded image.

SUMMARY OF THE INVENTION

The present invention is directed to an afocal optical system having an optical axis, comprising: a first paraboroid mirror, disposed on the optical axis, having a finite focal length; and an optical element, disposed on the optical axis, having a stereographic projection characteristics which is defined by the following equation:

$$hi' = 2 \cdot f \cdot \tan(\theta i/2)$$

where hi' is a height of a light beam, leaving the optical element, taken from the optical axis or a height of an image taken from the optical axis, f is a focal length of the optical element and $\theta i$ is an angle of incidence with respect to the optical element, the focal point of the optical element substantially coinciding with that of the first paraboroid mirror.

In another aspect of the present invention, an afocal optical system comprises: a spherical mirror, disposed on the optical axis, having a first focal length; and an equisolidangle projection lens, disposed on the optical axis, having an optical characteristics defined by the following equation:

$$hi' = 2 \cdot f \cdot \sin(\theta i/2)$$

where hi' is a height of a light beam, leaving the equisolidangle projection lens, taken from the optical axis or a height of an image taken from the optical axis, f is a focal length of the equisolidangle projection lens and $\theta i$ is an angle of incidence with respect to the equisolidangle projection lens, the focal point of the equisolidangle projection lens substantially coinciding with that of the spherical mirror.

The present invention is directed to a multibeam recording apparatus for recording an image on a recording surface, comprising: a light source unit for emitting a plurality of light beams; and a reduction afocal optical system for directing the light beams from the light source unit toward the recording surface, the reduction afocal optical system having an optical axis, wherein the reduction afocal optical system comprises a first paraboroid mirror, disposed on the optical axis, having a first finite focal length; and an optical element, disposed on the optical axis, having a stereographic projection characteristics which is defined by the following equation:

$$hi' = 2 \cdot f \cdot \tan(\theta i/2)$$

where hi' is a height of a light beam, leaving the optical element, taken from the optical axis or a height of an image taken from the optical axis, f is a second finite focal length of the optical element and $\theta i$ is an angle of incidence with respect to the optical element; and wherein the focal point of the optical element substantially coincides with that of the first paraboroid mirror.

In another aspect of the present invention, a multibeam recording apparatus for recording an image on a recording surface comprises: a light source unit for emitting a plurality of light beams; and a reduction afocal optical system for directing the light beams from the light source unit toward the recording surface, the reduction afocal optical system having an optical axis, wherein the reduction afocal optical system comprises a spherical mirror, disposed on the optical axis, having a finite focal length and an equisolidangle projection lens, disposed on the optical axis, having an optical characteristics defined by the following equation:

$$hi' = 2 \cdot f \cdot \sin(\theta i/2)$$

where hi' is a height of a light beam, leaving the equisolidangle projection lens, taken from the optical axis or a height of an image taken from the optical axis, f is a focal length of the equisolidangle projection lens and $\theta i$ is an angle of incidence with respect to the equisolidangle projection lens; and wherein the focal point of the equisolidangle projection lens substantially coincides with that of the spherical mirror.

Accordingly, it is an object of the present invention to obtain a compact afocal optical system which satisfies $hi' = m \cdot hi$ where the heights of incident and leaving light beams are hi and hi' and a magnification is m and which is manufactured at low costs.

It is another object of the present invention to prevent a light beam to be partially blocked in the afocal optical system.

It is a further object of the present invention to remove a noise component from an incident light beam in the afocal optical system and to enhance telecentric characteristic of the afocal optical system.

It is another object of the present invention to obtain a multibeam recording apparatus which is small despite an increased number of channels, which performs image drawing at a high accuracy, and which is manufactured at low costs.

These and other objects, features, aspects and advantages of the present invention will become more apparent from the following detailed description of the present invention when taken in conjunction with the accompanying drawings.

DESCRIPTION OF THE PREFERRED EMBODIMENTS

A. Afocal Optical System (1) First Preferred Embodiment

Figure 4:
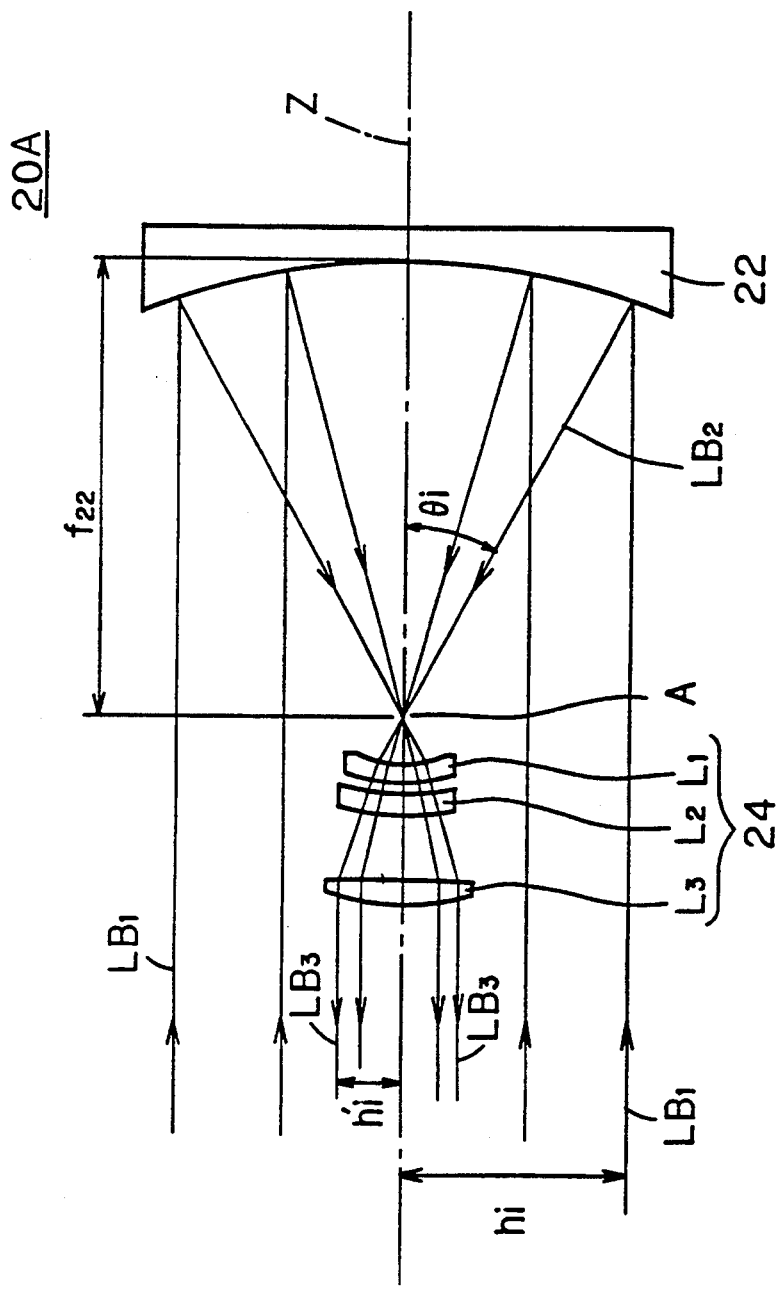
FIG. 4 is a plan view of an afocal optical system according to a first preferred embodiment of the present invention.

FIG. 4 is a plan view of an afocal optical system according to a first preferred embodiment of the present invention. The afocal optical system 20A is comprised of a paraboroid mirror 22 and a stereographic projection lens 24 which are disposed with a distance from each other so that the focal points of the mirror 22 and the lens 24 coincide with each other at a predetermined point A. Hence, a light beam LB1, entering the afocal optical system 20A parallel to the optical axis Z from a light source unit (described later) or an original, would be converted into a light beam LB3 leaving the afocal optical system 20A parallel to the optical axis Z. In the afocal optical system 20A, the following relation $$hi' = m1 \cdot hi \tag{1}$$

is always satisfied where hi is a height of the incident light beam LB1 taken from the optical axis Z and hi' is a height of the leaving light beam LB3 taken from the optical axis Z. The reason will be described below.

For example, the light beam LB1 impinged onto the paraboroid mirror 22 parallel to the optical axis Z at an object height (i.e., a height from the optical axis Z) hi is reflected by the paraboroid mirror 22 to become a reflected light beam LB2 which will pass through a point A, which is away from the paraboroid mirror 22 by the focal length f22, at an angle $\theta i$ (FIG. 4). Here, because of the optical characteristics of the paraboroid mirror 22, $$\tan(\theta i/2) = hi/(2 \cdot f22) \tag{2}$$

The light beam LB2 passed through the point A then enters the stereographic projection lens 24 which has the following image height characteristics ("stereographic projection characteristics" as herein termed) that are given as:

$$hi' = 2 \cdot f24 \cdot \tan(\theta i/2) \tag{3}$$

where f24 is a focal length of the stereographic projection lens 24 and hi' is an image height (i.e., a height from the optical axis Z). Hence, the image height hi' of the light beam LB3 emerging from the stereographic projection lens 24 is found by substituting Eq. 2 in Eq. 3:

$$\begin{aligned} hi' &= 2 \cdot f24 \cdot hi/(2 \cdot f22) \\ &= (f24/f22) \, hi \\ &= m1 \cdot hi \end{aligned} \tag{4}$$

where m1 is a magnification of the afocal optical system 20A.

Having such a construction, the afocal optical system promises excellent optical performances but is less expensive to manufacture. The secrete is in that technique of forming the paraboroid mirror 22 is already completed to such an extent that the paraboroid mirror 22 is accurately formed in an easy manner at low costs. Further, the fact that the paraboroid mirror 22 includes only one surface which is to be processed and the paraboroid mirror 22 is large in aperture but small in F-number also contributes to reduction in size and manufacturing costs of the optical system.

(2) Second Preferred Embodiment

Figure 5:
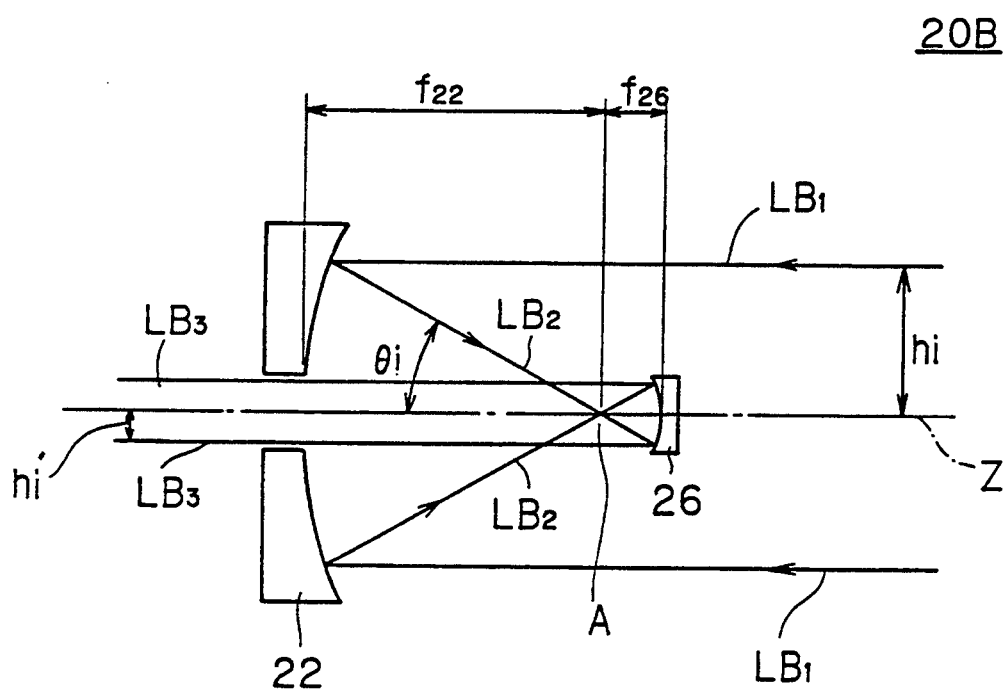
FIG. 5 is a plan view of an afocal optical system according to a second preferred embodiment of the present invention.

FIG. 5 is a plan view of an afocal optical system according to a second preferred embodiment of the present invention. Provision of a paraboroid mirror 26 instead of the stereographic projection lens 24 is where the afocal optical system 20B of the second preferred embodiment (FIG. 5) stands different from the first preferred embodiment (FIG. 4). That is, the afocal optical system 20B is comprised of two paraboroid mirrors 22 and 26 which have different focal lengths and which are disposed in a faced relation with each other in such a manner that their focal points meet at a point A. A light beam LB1 entering the afocal optical system 20B parallel to the optical axis Z is reflected by the paraboroid mirror 22 and thereafter by the paraboroid mirror 26, whereby a light beam LB3 emerges from the afocal optical system 20B parallel to the optical axis Z while the system 20B satisfies a condition similar to Eq. 4 (described later as Eq. 6). The mechanism of this will be described below.

For instance, when the light beam LB1 enters the afocal optical system 20B parallel to the optical axis Z at an object height (i.e., a height from the optical axis Z) hi, Eq. 2 is satisfied due to the optical characteristics of the paraboroid mirror 22. Since the paraboroid mirror 26 has the same characteristics (stereographic projection characteristics) as those of the stereographic projection lens 24, $$hi' = 2 \cdot f26 \cdot \tan(\theta i/2) \tag{5}$$

where f26 is a focal length of the paraboroid mirror 26. Therefore, from Eqs. 2 and 5, $$\begin{aligned} hi' &= 2 \cdot f26/(2 \cdot f22) \\ &= (f26/f22) \, hi \\ &= m2 \cdot hi \end{aligned} \tag{6}$$

where m2 is a magnification of the afocal optical system 20B. Hence, the effects promised in the first preferred embodiment are also promised in the second preferred embodiment. In addition, requiring the afocal optical system to be comprised of the only two paraboroid mirrors 22 and 26, the second preferred embodiment produces unique effect that chromatic aberration will not be created at all basically.

Although the first and the second preferred embodiments have been described in relation to where the light beam LB1 enters from the paraboroid mirror 22 and the light beam LB3 goes out from the optical element (the stereographic projection lens 24 in the first preferred embodiment and the paraboroid mirror 26 in the second preferred embodiment) in the foregoing, the effects described above remain intact where the light beam LB1 enters from the optical element and the light beam LB3 goes out from the paraboroid mirror 22.

(3) Third Preferred Embodiment

Figure 6:
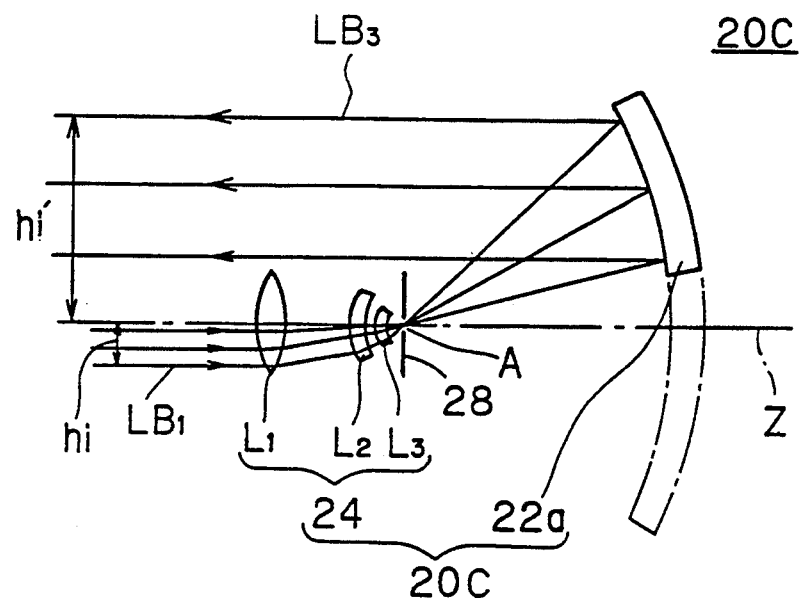
FIG. 6 is a plan view of an afocal optical system according to a third preferred embodiment of the present invention.

FIG. 6 is plan view of an afocal optical system according to a third preferred embodiment of the present invention. A major difference between the afocal optical system 20C and the first preferred embodiment (FIG. 4) is that while the first preferred embodiment uses the whole paraboroid mirror 22, the third preferred embodiment uses a portion of the paraboroid mirror 22, more precisely, a region 22a which is off the rotation symmetric axis of the paraboroid mirror 22 (In this preferred embodiment, the rotation symmetric axis coincides with the optical axis Z). In general, a paraboroid mirror which is formed by only the region 22a is referred to as "off-axis paraboroid mirror." In sharp contrast, a whole paraboroid mirror (the paraboroid mirrors 22 and 26 of the first and the second preferred embodiments) is herein referred to simply as "paraboroid mirror."

A further difference between the afocal optical system 20C and the first preferred embodiment is that a stop 28 is disposed at a point A where the focal points of the paraboroid mirror 22 and the stereographic projection lens 24 coincide with each other. Since the other structural features are generally similar to those of the first preferred embodiment, redundant description will be omitted.

Similarly to the first preferred embodiment, when a light beam LB1 impinges on the afocal optical system 20C of the third preferred embodiment parallel the optical axis Z, a light beam LB3 comes out from the afocal optical system 20C. Hence, the effects of the first preferred embodiment are attainable in the third preferred embodiment.

The third preferred embodiment creates still other effect because of the provision of the off-axis paraboroid mirror 22a. More particularly, in the afocal optical system 20A of the first preferred embodiment, as shown in FIG. 4, a portion of the incident light beam LB1 is blocked by the stereographic projection lens 24 so that a center portion of the light beam LB3 leaving the afocal optical system 20A is blocked. This problem also occurs where the light beam LB1 enters the optical system from the stereographic projection lens 24. In sharp contrast, in the third preferred embodiment, as shown in FIG. 6, the light beam LB3 leaves the afocal optical system 20C without partially blocked by the stereographic projection lens 24.

Further, in the third preferred embodiment, since the stop 28 is disposed at the point A where the focal points of the off-axis paraboroid mirror 22a and the stereographic projection lens 24 coincide with each other, a noise component is removed from the light beam LB1 and the afocal optical system 20C has an improved telecentric quality in the imaging side. These effects will be described in detail later.

(4) Fourth Preferred Embodiment

Figure 7:
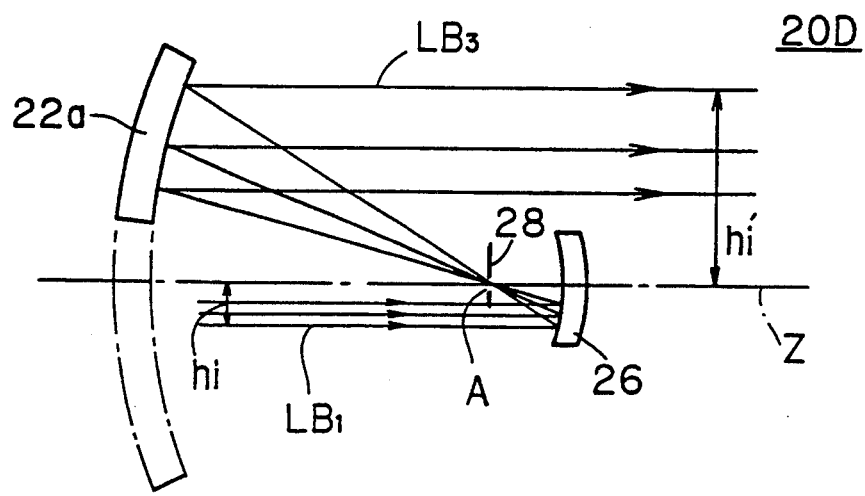
FIG. 7 is a plan view of an afocal optical system according to a fourth preferred embodiment of the present invention.

FIG. 7 is a plan view of an afocal optical system according to a fourth preferred embodiment of the present invention. The afocal optical system 20D is comprised of an off-axis paraboroid mirror 22a and a paraboroid mirror 26 which are disposed in a faced relation in such a manner that their focal points coincide with each other at a point A. In other words, the afocal optical system 20D is the same as the system of the second preferred embodiment (FIG. 5) except that the off-axis paraboroid mirror 22a is used in stead of the paraboroid mirror 22 and that a stop 28 is disposed at the point A. Hence, the afocal optical system 20D not only attains effects similar to those attainable in the second preferred embodiment but also produces the effects which are described immediately above in relation to the provision of the off-axis paraboroid mirror 22a and the stop 28.

(5) Fifth Preferred Embodiment

Figure 8:
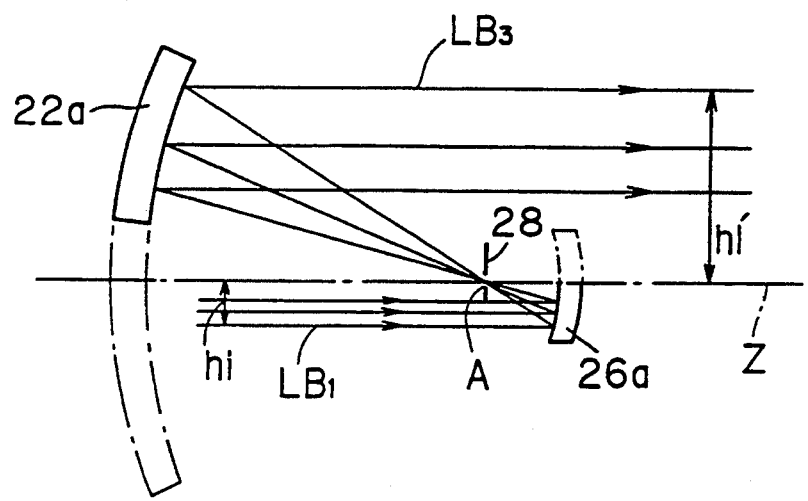
FIG. 8 is a plan view of an afocal optical system according to a fifth preferred embodiment of the present invention.

It is to be noted that the paraboroid mirror 26 may be replaced with an off-axis paraboroid mirror 26a as shown in FIG. 8. Such an afocal optical system 20E, which is comprised of two off-axis paraboroid mirrors 22a and 26a, also promises the same effects as those attainable in the fourth preferred embodiment.

(6) Sixth Preferred Embodiment and Other Embodiments

Figure 9:
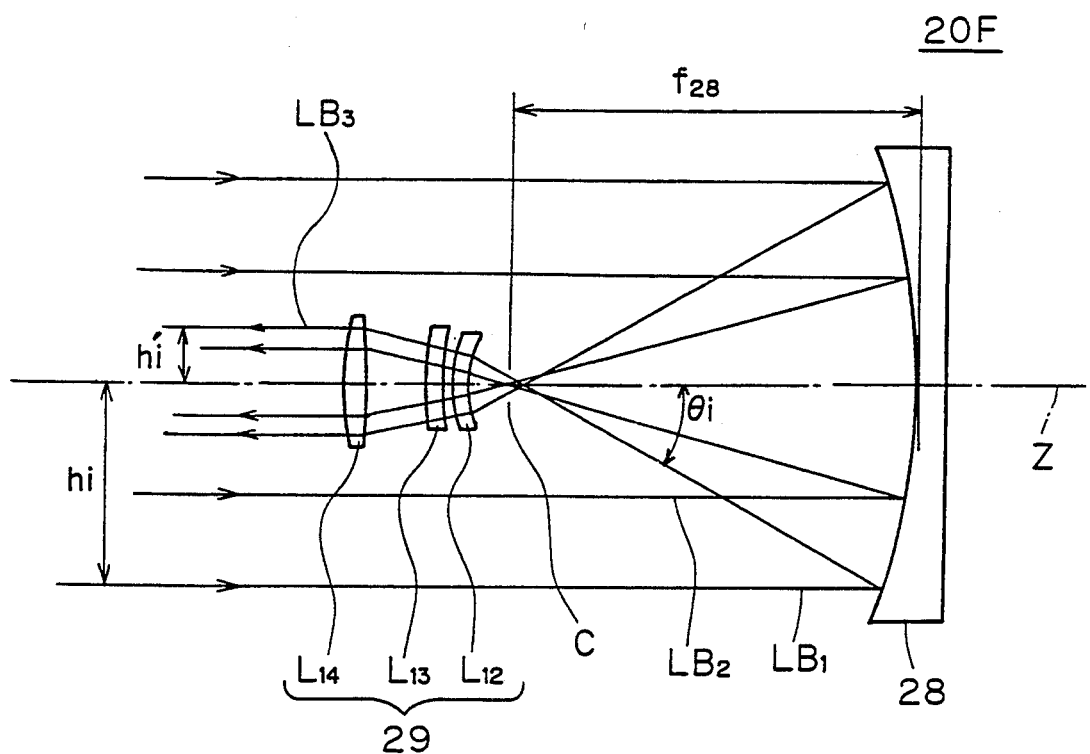
FIG. 9 is a plan view of an afocal optical system according to a sixth preferred embodiment of the present invention.

FIG. 9 is a plan view of an afocal optical system according to a sixth preferred embodiment of the present invention. The afocal optical system 20F is comprised of a spherical mirror 28 and an equisolidangle projection lens 29. In the afocal system 20F, the focal points of the spherical mirror 28 and the equisolidangle projection lens 29 coincide with each other at a point C, the effects hereinabove described are ensured. The reason is as follows.

When laser beams LB1 enters the spherical mirror 28 parallel to the optical axis Z, spherical aberration occurs at the spherical mirror 28 because of the optical characteristics which are inherent to a spherical mirror. Here, assume that the height of the incident laser beams LB1 taken from the optical axis Z is hi and laser beams LB2 reflected by the spherical mirror 28 crosses the optical axis Z at an angle $\theta i$, the characteristics of the spherical mirror 28 cause that the laser beams LB2 satisfy:

$$\sin(\theta i/2) = hi/(2 \cdot f28) \quad (8)$$

where f28 is a focal length of the spherical mirror 28. On the other hand, the equisolidangle projection lens 29, formed by three lenses L12 to L14, for example, exhibits an optical characteristic that is given as:

$$hi' = 2 \cdot f29 \cdot \sin(\theta i/2) \quad (9)$$

where hi' is a height of a laser beam coming from the equisolidangle projection lens 29. Substituting Eq. 8 in Eq. 9, $$\begin{aligned} hi' &= 2 \cdot f29 \cdot hi/(2 \cdot f28) \\ &= (f29/f28) \, hi \\ &= m3 \cdot hi \end{aligned} \quad (10)$$

Thus, since Eq. 10 is satisfied by combining the spherical mirror 28 and the equisolidangle projection lens 29 and since the equisolidangle projection lens 29 causes aberration that is opposite to the aberration which is caused by the spherical mirror 28 so that aberrations cancel out each other in the afocal optical system 20F as a whole, excellent optical characteristics are promised.

In the foregoing, the third to the fifth preferred embodiments have been described in relation to where the light beam LB1 enters from the optical element (the stereographic projection lens 24 in the third preferred embodiment; the paraboroid mirror 26 in the fourth preferred embodiment; the off-axis paraboroid mirror 26a in the fifth preferred embodiment) and the light beam LB3 leaves the optical system from the off-axis paraboroid mirror 22a. The effects of these preferred embodiments will not be punctured where the light beam LB1 enters the off-axis paraboroid mirror 22a and the light beam LB3 leaves from the optical element.

In the first and the second preferred embodiment, the stop 28 may be disposed at the point A, in which case the effects above (elimination of noise, etc) are attainable. Conversely, the stop 28 is not an essential element in the afocal optical systems of the third to the fifth preferred embodiments.

B. Optical Apparatus Comprising Afocal Optical System

In the following, optical apparatuses comprising the afocal optical systems 20A to 20E will be described.

B-1. Multibeam Recording Apparatus

(1) First Preferred Embodiment

Figure 10:
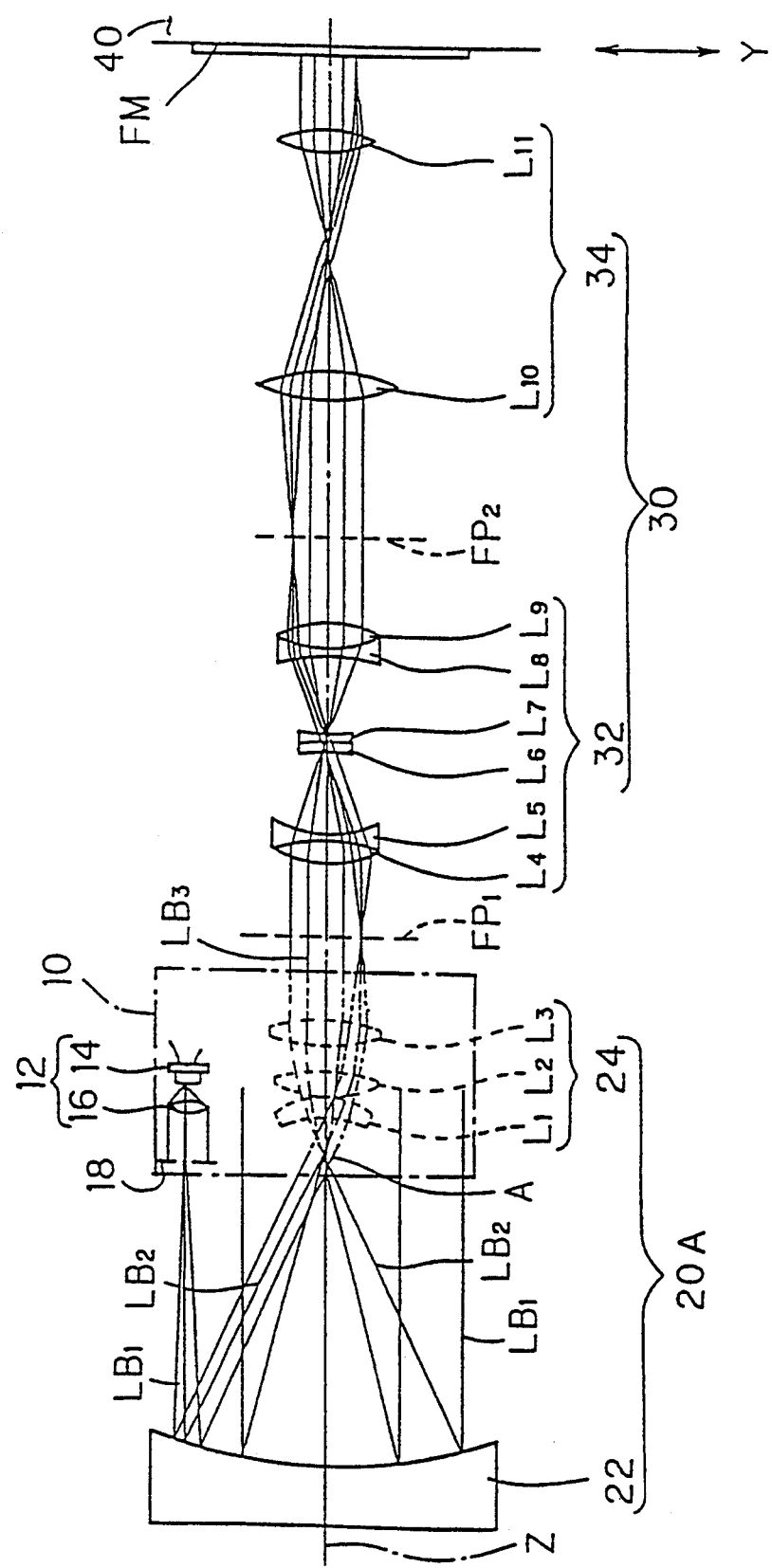
FIG. 10 is a plan view of a multibeam recording apparatus according to a first preferred embodiment of the present invention.
Figure 11:
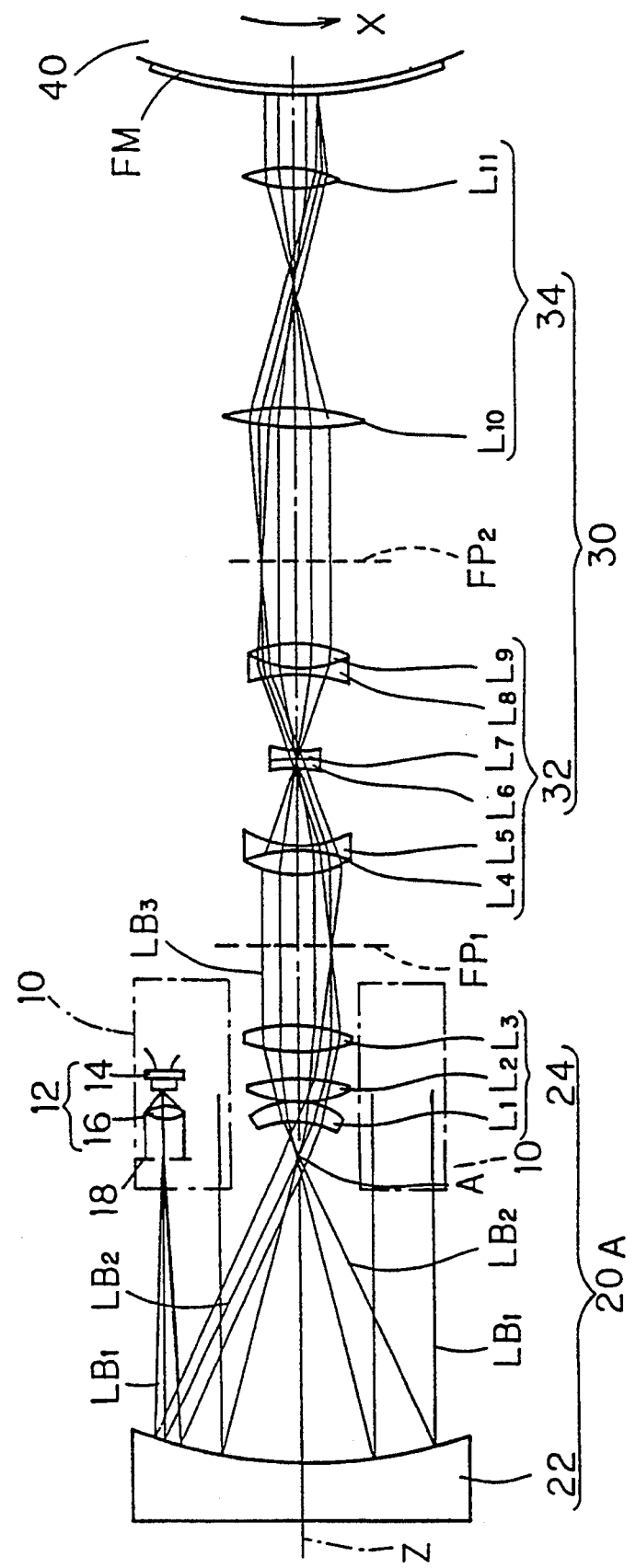
FIG. 11 is a side view of a multibeam recording apparatus according to a first preferred embodiment of the present invention.

FIGS. 10 and 11 are a plan view and a side view, respectively, of a multibeam recording apparatus according to a first preferred embodiment of the present invention. The multibeam recording apparatus comprises a light source unit 10 for emitting a plurality of laser beams, a reduction afocal optical system 20A, an afocal optical system 30 and a rotation cylinder 40. In synchronism with rotation of the rotation cylinder 40 with a photosensitive material FM wound therearound in a primary scanning direction X, light beams from the light source unit 10 move in a sub scanning direction Y, which is approximately perpendicular to the primary scanning direction, through the reduction afocal optical system 20A and the afocal optical system 30. As a result, a desired image is recorded on the photosensitive material FM.

Figure 12:
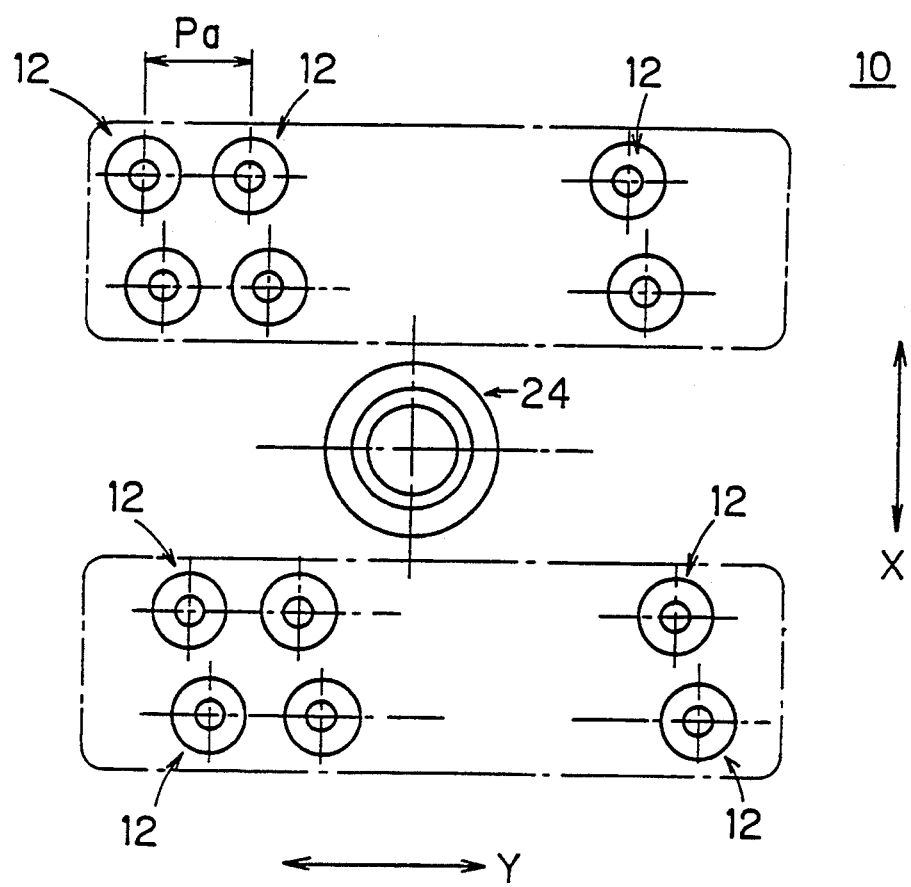
FIG. 12 is a front view of a light source unit.

FIG. 12 is a front view of the light source unit 10. In FIG. 12, the light source unit 10 is comprised of a plurality of light source parts 12 which are arranged at predetermined pitches Pa. Each light source part 12 is formed by a semiconductor laser 14 and a collimating lens 16. A light beam from the semiconductor laser 14 is collimated by the collimating lens 16 to become a parallel light beam which will be then emitted from an aperture 18 of the light source part 12 parallel to the optical axis Z (FIGS. 10 and 11). The aperture 18 is disposed on the focal plane of a paraboroid mirror 22. As understood from FIG. 12, the light source parts 12 are arranged so as to partially overlap with each other in the primary scanning direction X. This is to prevent a split in scanning lines, that is, separation of adjacent scanning lines from each other due to mechanical dimensional restraints of the light source parts 12. In addition, to avoid mechanical interference with the reduction afocal optical system 20A, the light source parts 12 are divided into two groups in their arrangement (FIG. 11).

The reduction afocal optical system 20A has the same structure as that of the conventional afocal optical system of FIG. 4. That is, the reduction afocal optical system 20A is comprised of the paraboroid mirror 22 and a stereographic projection lens 24 which are disposed in such a manner that the focal points of the mirror 22 and the lens 24 coincide with each other at a predetermined point A. Hence, a laser beam LB1 entering the reduction afocal optical system 20A parallel to the optical axis Z from the light source unit 10 would converted into a laser beam LB3 leaving the reduction afocal optical system 20A parallel to the optical axis Z. Further, in the reduction afocal optical system 20A, the Eq. 1 is always satisfied, and hence the laser beams LB1 emitted from the light source unit 10 at the same pitches Pa are focused at a rear focal plane FP1 of the stereographic projection lens 24 so that intermediate images of the apertures 18 are formed on the rear focal plane FP1 at equal intervals. It is to be noted that the aperture images are imaged on the rear focal plane FP1 only when the apertures 18 are arranged on the focal plane of the paraboroid mirror 22. If the apertures 18 are off the focal plane of the paraboroid mirror 22, the aperture images, too, will be off the rear focal plane FP1. The displacement of the aperture images from the rear focal plane FP1 is determined by a longitudinal magnification of the reduction afocal optical system 20A.

As shown in FIGS. 10 and 11, the afocal optical system 30 is disposed between the reduction afocal optical system 20A and the rotation cylinder 40. The afocal optical system 30 is comprised of a zoom lens 32 which is formed by lenses L4 to L9 and an afocal optical system 34 which is formed by lenses L10 and L11. The zoom lens 32 has afocal characteristics or telecentric characteristics, and the magnification ration thereof can be varied by moving at least one of the lenses L4 to L9 while the distance between an object and an image is kept constant. In the afocal optical system 30, the image plane of the zoom lens 32 coincides with a front focal plane of the lens L10 of the afocal optical system 34 at a plane FP2 so that the zoom lens 32 and the afocal optical system 34 as a whole are also afocal. The object plane of the zoom lens 32 coincides with the rear focal plane of the stereographic projection lens 24 of the reduction afocal optical system 20A at the plane FP1 while the photosensitive material FM (recording surface) is placed at the rear focal plane of the lens L11 of the afocal optical system 34. Hence, the intermediate images (i.e., the aperture images) formed on the plane FP1 are reduced at an appropriate magnification by the afocal optical system 30 and imaged as the aperture images (i.e., beam spots) on the photosensitive material FM. Therefore, the beam spots on the photosensitive material FM are arranged at equal intervals, that is, the beam pitches are uniform. It is to be noted that the beam spots are formed on the photosensitive material FM only when the intermediate images are formed on the plane FP2. If the intermediate images are off the plane FP2, as described above with respect to the reduction afocal optical system 20A, the beam spots will be off the photosensitive material FM. The displacement of the beam spots from the photosensitive material FM is determined by a longitudinal magnification of the afocal optical system 34.

As described above, in this embodiment, the plurality of the laser beams LB1 from the light source unit 10 are converged at a point by the paraboroid mirror 22, and the laser beams from that point are emitted from the reduction afocal optical system 20A through the stereographic projection lens 24. Hence, the reduction afocal optical system 20A remains small even when the number of channels is increased. That is, technique of forming the paraboroid mirror 22 is already completed to such an extent that the paraboroid mirror 22 is accurately formed in an easy manner at low costs. Further, the fact that the paraboroid mirror 22 includes only one surface which is to be processed and the paraboroid mirror 22 is large in diameter but small in F-number also contributes to reduction in size and manufacturing costs of the optical system. Further, since the laser beams LB3 leave the reduction afocal optical system 20A parallel to the optical axis Z while the system 20A satisfies Eq. 1, the beam pitches on the photosensitive material FM (recording surface) are uniform, enabling highly accurate image drawing. Still further, since each laser beam is irradiated onto the photosensitive material FM from approximate upright as shown in FIGS. 10 and 11 in this embodiment, even if the photosensitive material FM is moved along the optical axis Z, no change in the magnification and hence accurate image drawing on the photosensitive material FM are promised.

(2) Second Preferred Embodiment

Figure 13:
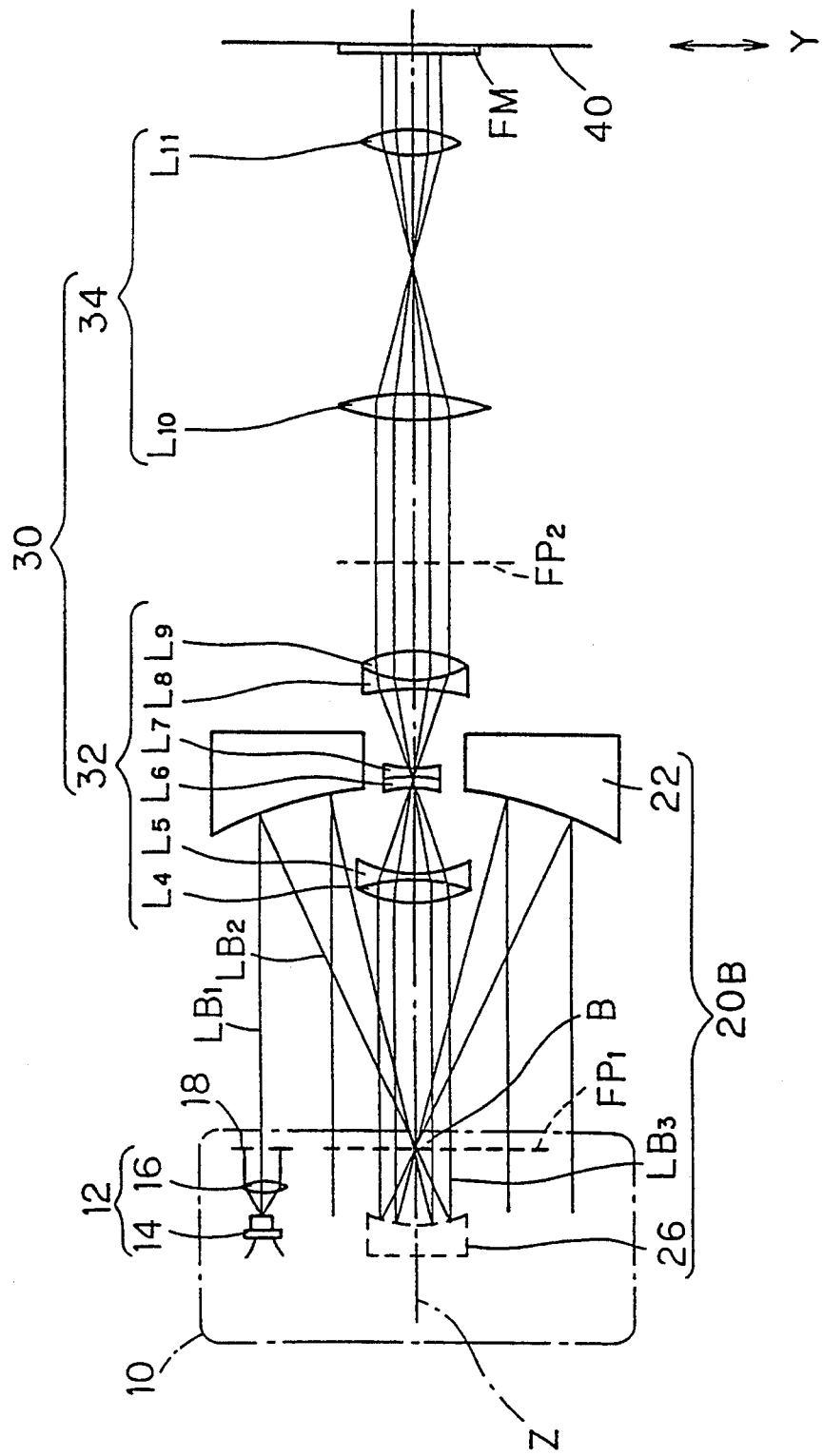
FIG. 13 is a plan view of a multibeam recording apparatus according to a second preferred embodiment of the present invention.

FIG. 13 is a plan view of a multibeam recording apparatus according to a second preferred embodiment of the present invention. A major difference between the illustrative multibeam recording apparatus and the first preferred embodiment is that provision of a paraboroid mirror 26 instead of the stereographic projection lens 24. That is, the multibeam recording apparatus comprises the afocal optical system 20B of FIG. 5 as a reduction afocal optical system. In more detail, the reduction afocal optical system 20B is comprised of the two paraboroid mirrors 22 and 26 which are disposed in a faced relation in such a manner that their focal points coincide with each other at a point A and that laser beams from the light source unit 10 are serially reflected by the paraboroid mirrors 22 and 26 to be thereafter irradiated onto the photosensitive material FM through the afocal optical system 30 which has the same structure as the corresponding optical system of the first preferred embodiment.

The focal length f22 of the paraboroid mirror 22 is different from the focal length f26 of the paraboroid mirror 26. Where the paraboroid mirror 26 is provided to replace the stereographic projection lens 24, the laser beams LB1 parallel to the optical axis Z impinging on the reduction afocal optical system 20B would result in that the laser beams LB3 parallel to the optical axis Z leave the reduction afocal optical system 20B while satisfying Eq. 1, which is similar to the first preferred embodiment. The reason is as follows.

(3) Third Preferred Embodiment

Although the foregoing has described that the afocal optical systems 20A and 20B are formed by the paraboroid mirror 22 and the stereographic projection lens 24 (first preferred embodiment) or formed by the two paraboroid mirrors 22 and 26 (second preferred embodiment), it is possible that the afocal optical system is formed by the spherical mirror 28 and the equisolidangle projection lens 29 of FIG. 9.

The third preferred embodiment is generally identical to the first and the second preferred embodiments except for the afocal optical system, and therefore, similar description will be simply omitted.

(4) Fourth Preferred Embodiment

Figure 14:
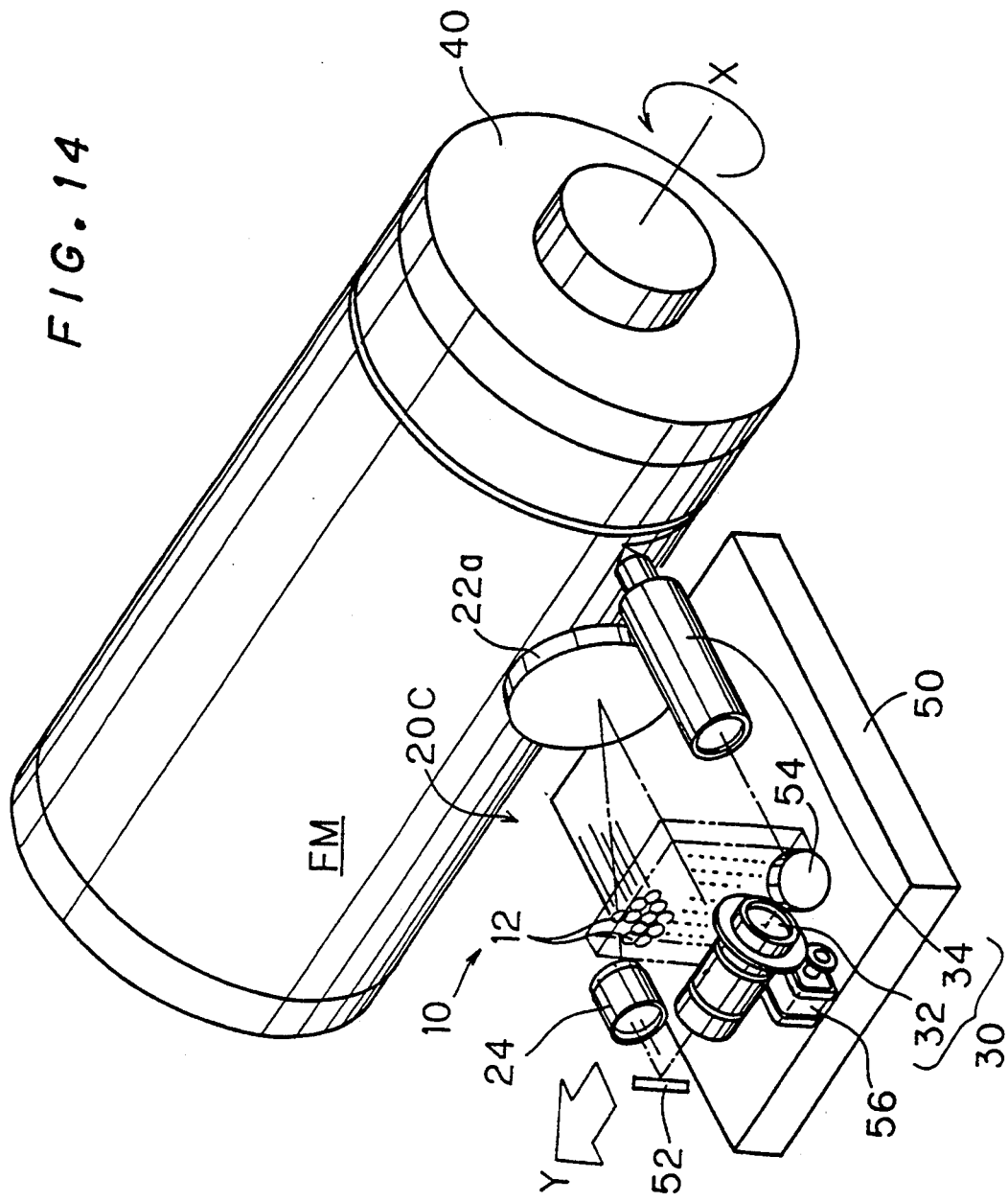
FIG. 14 is a perspective view of a multibeam recording apparatus according to a fourth preferred embodiment of the present invention.
Figure 15:
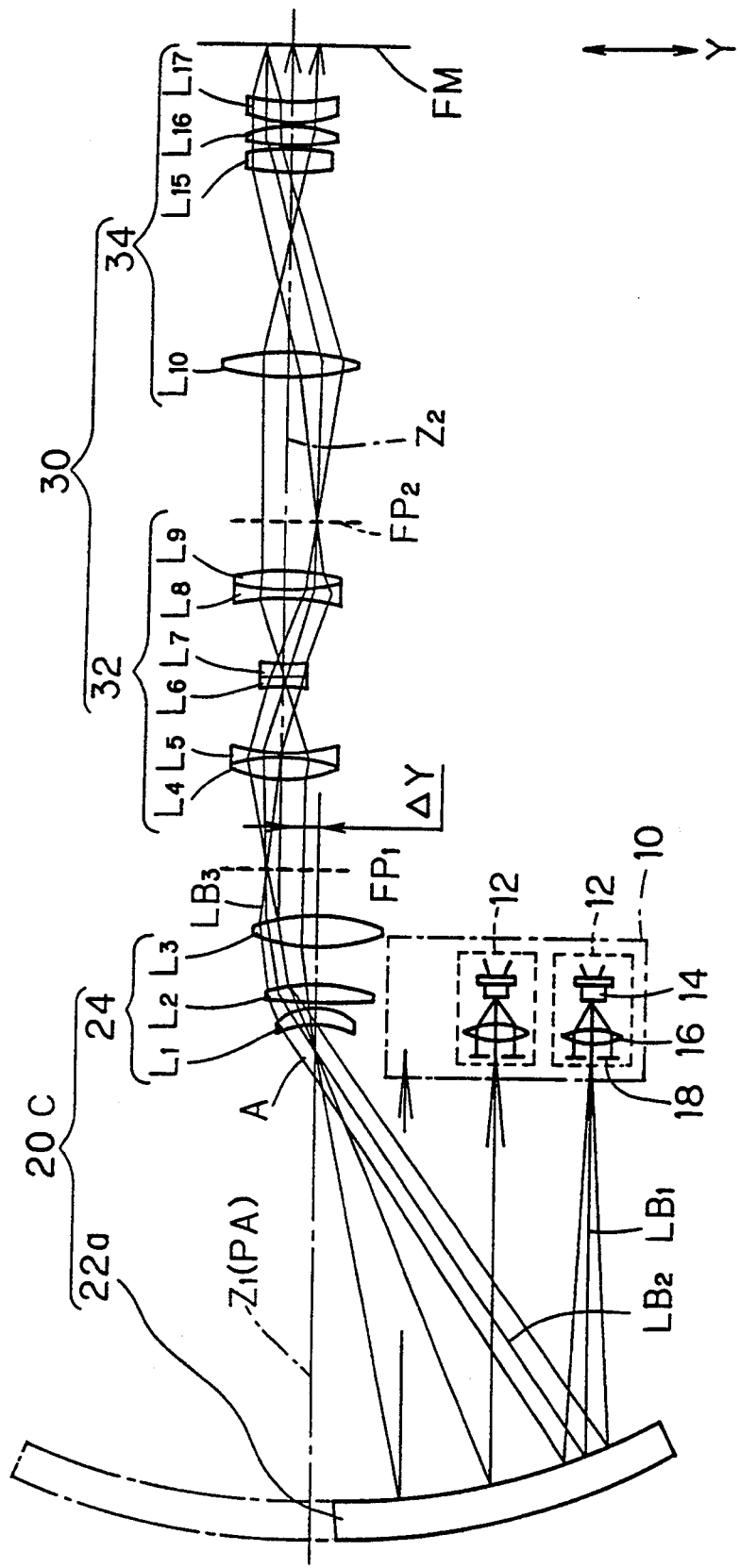
FIG. 15 is a plan view of a multibeam recording apparatus according to a fourth preferred embodiment of the present invention.

FIGS. 14 and 15 are a perspective view and a plan view, respectively, of a multibeam recording apparatus according to a fourth preferred embodiment of the present invention. The illustrative multibeam recording apparatus largely departs from the first preferred embodiment on two points. The first major difference is that the afocal optical system 20C of FIG. 6 is used as a reduction afocal optical system in the fourth embodiment. The second major difference is that the optical axis Z1 of the afocal optical system 20C is displaced from the optical axis Z2 of the afocal optical system 30 by a predetermined distance ΔY in the sub scanning direction Y. Although no practical problem will occur even if the two optical axes coincide with each other as in the first preferred embodiment (FIG. 10), when the off-axis paraboroid mirror 22a is used, some of the laser beams LB3 from the afocal optical system 20C will not enter the afocal optical system 30. In sharp contrast, in the fourth preferred embodiment, since the optical axes are not aligned to each other, the whole afocal optical system 30 is involved in directing the laser beams LB3 toward the photosensitive material FM from the afocal optical system 21)C as shown in FIG. 15. Hence, a compact afocal optical system 30 is obtained.

In FIG. 14, indicated at reference numeral 50 is a base which is freely slidable in the sub scanning direction Y. The base 50 mounts the light source unit 10, the off-axis paraboroid mirror 22a, the stereographic projection lens 24, a reflecting mirror 52, the zoom lens 32, a reflecting mirror 54 and an afocal optical system 34 thereon, thereby forming a recording head. The afocal optical system 34 is comprised of a lens 10 and lenses L15 to L17. The recording head is provided with a drive mechanism (not shown) which moves the recording head in the sub scanning direction Y. To adjust the magnification of the zoom lens 32, the zoom lens 32 is linked to a pulse motor 56.

Figure 16:
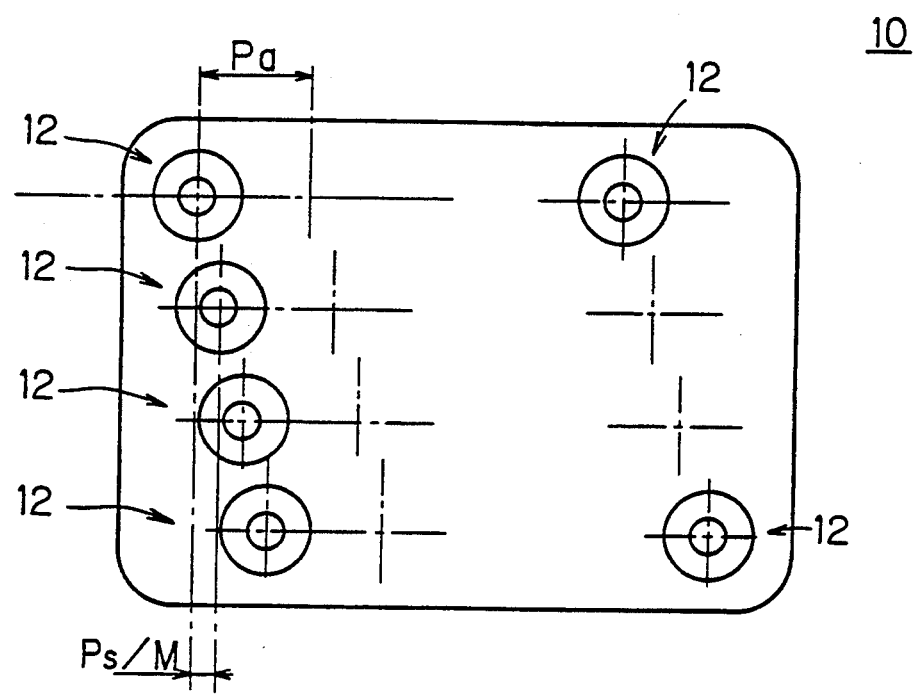
FIG. 16 is a plan view showing how the light source parts are arranged.

FIG. 16 is a plan view showing the arrangement of the light source parts 12. In FIG. 16, a plurality of light source parts 12 are two-dimensionally arranged at the same pitches Pa in the light source unit 10. Similarly to the first preferred embodiment, the light source parts 12 are displaced from each other by (the scanning pitch Ps)/(the magnification M of the optical system) to partially overlap with each other in the primary scanning direction X in order to prevent a split in scanning lines.

In the multibeam recording apparatus having such a construction, a plurality of laser beams LB1 from the light source unit 10 parallel to the optical axis Z1 are reflected by the off-axis paraboroid mirror 22a and then focused on the rear focal plane FP1 of the stereographic projection lens 24 therethrough. Since the apertures 18 are arranged on the focal plane of the off-axis paraboroid mirror 22a, intermediate images (i.e., the aperture images) are formed on the plane FP1. The image height of each intermediate image and the height of each laser beam LB1 from the light source part 12 satisfy Eq. 1 as described earlier in relation to the first preferred embodiment, and therefore, a plurality of intermediate images are formed on the plane FP1 at equal intervals. The intermediate images are then reduced at an appropriate magnification by the afocal optical system 30 and formed on the photosensitive material FM (recording surface) which is wound around the rotation cylinder 40 as images (beam spots).

As described above, in the fourth preferred embodiment, similarly to the first preferred embodiment, the laser beams LB1 from the light source unit 10 are imaged as intermediate images on the plane FP1 through the paraboroid mirror 22 and the stereographic projection lens 24 while the embodiment satisfies Eq. 1, and then imaged on the photosensitive material FM by the afocal optical system 30. Hence, the effects attainable in the first preferred embodiment are also attainable in the fourth preferred embodiment.

Figure 17:
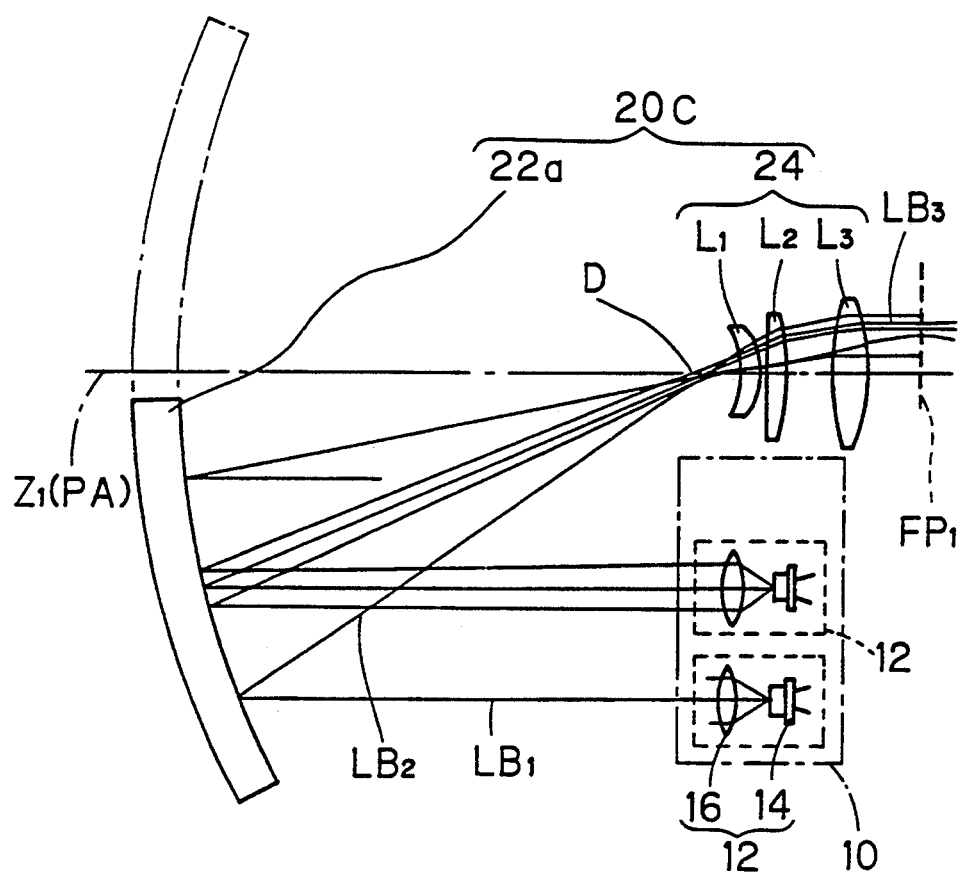
FIG. 17 is a plan view showing a modification of the multibeam recording apparatus according to the present invention.

Although the fourth preferred embodiment is related to where the apertures 18 are used, the apertures 18 are not essential elements. An example of where the apertures are not provided is shown in FIG. 17 in which the laser beams LB1 from the semiconductor lasers 14 are collimated by the collimating lenses 16 into parallel light beams which will be then reflected by the paraboroid mirror 22 and converged as beam waists at the focal point D of the paraboroid mirror 22. Since the focal point D of the paraboroid mirror 22 is the front focal point of the stereographic projection lens 24, the beam waists of the laser beams LB3 passed through the stereographic projection lens 24 is formed at the rear focal plane FP1 of the stereographic projection lens 24. In a similar manner, beam waists are formed on the photosensitive material FM which is disposed at the rear focal plane of the lens L17 of the afocal optical system 34 (FIG. 15). Hence, images are drawn with extremely small beam spots at as high accuracy as that of where the apertures are provided.

Figure 18:
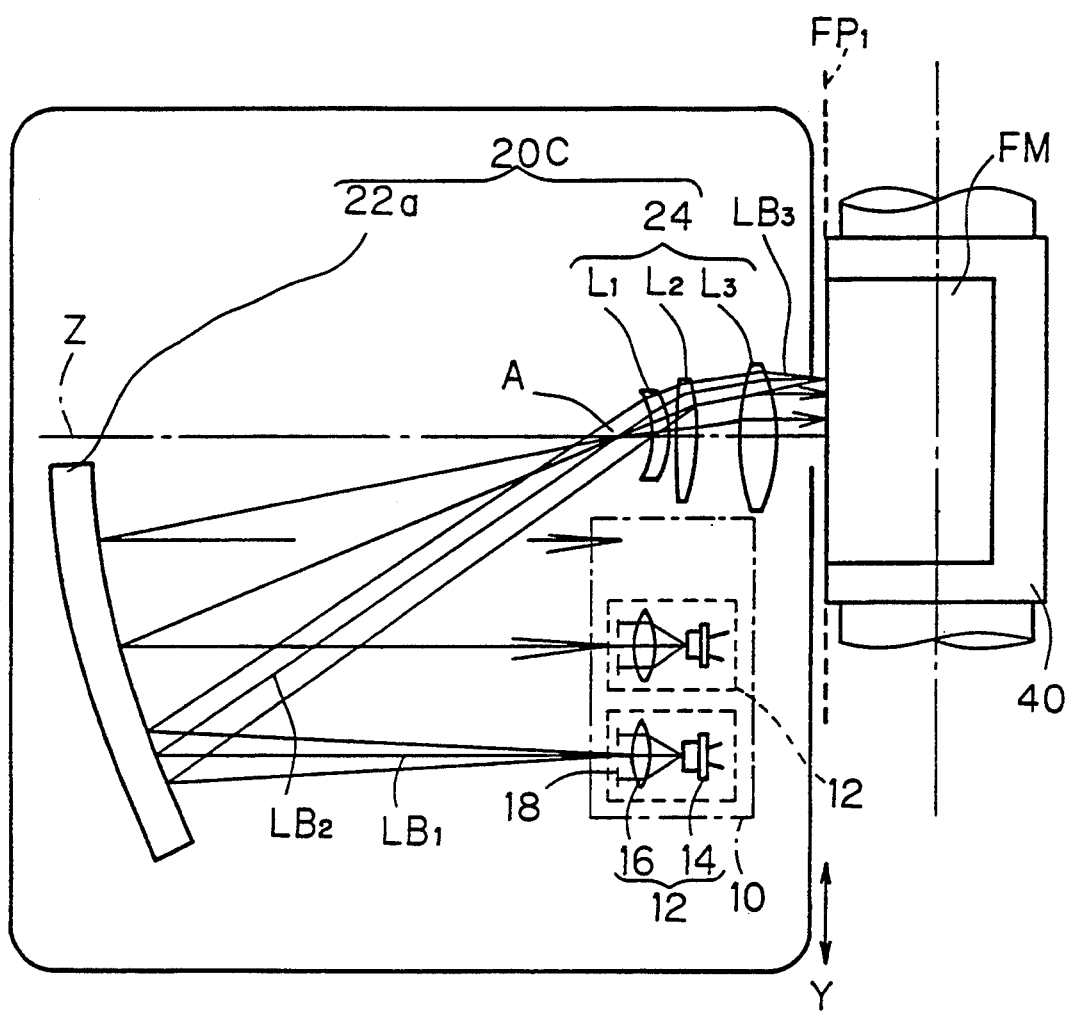
FIG. 18 is a plan view showing another modification of the multibeam recording apparatus according to the present invention.

The afocal optical system 30 is not essential to the multibeam recording apparatus. As shown in FIG. 18, the multibeam recording apparatus may be formed only by the light source unit 10 and the reduction afocal optical system 20C, in which case, the photosensitive material FM (recording surface) is to be disposed at the rear focal plane FP1 of the stereographic projection lens 24.

Figure 19:
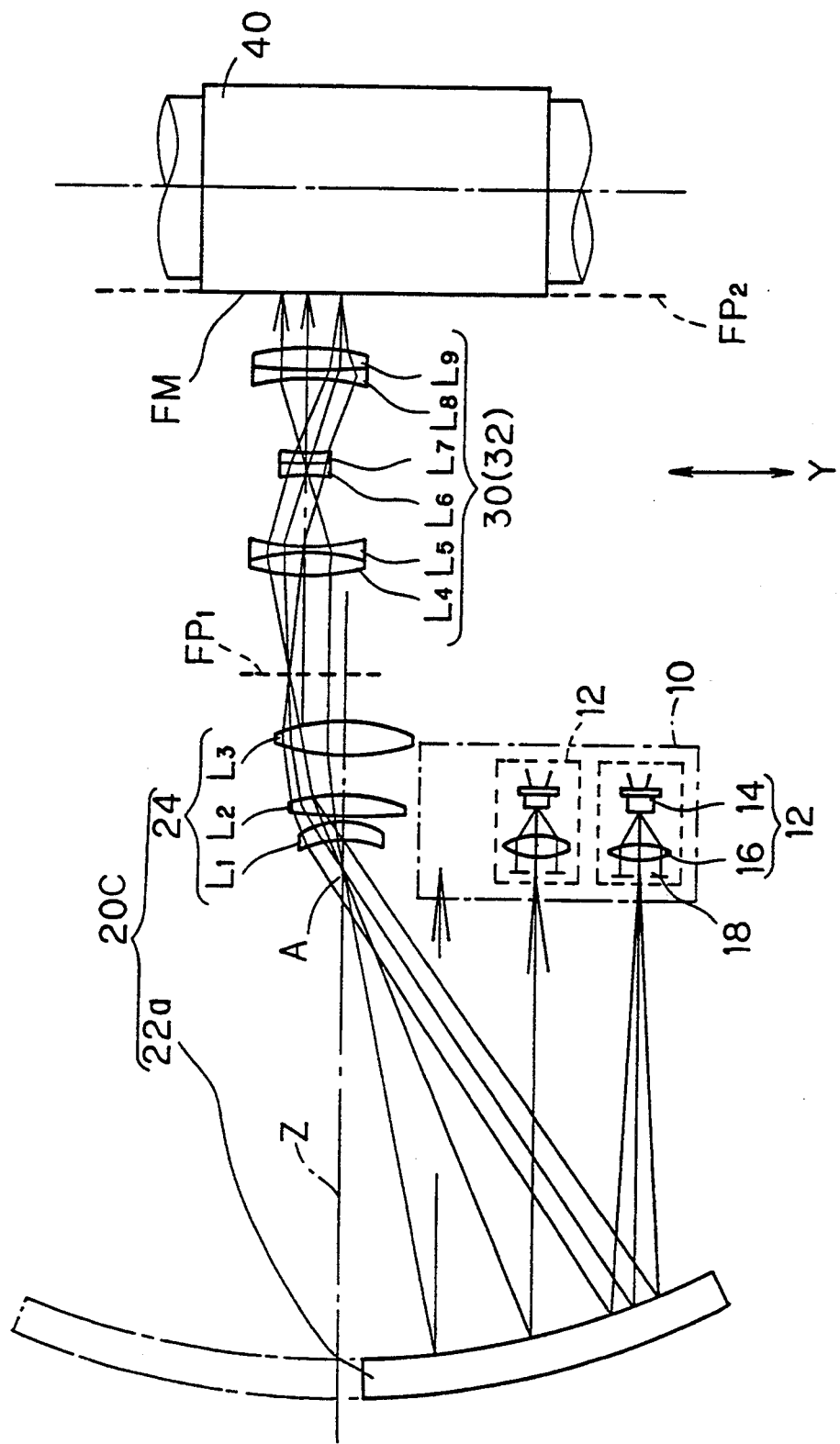
FIG. 19 is a plan view showing a further modification of the multibeam recording apparatus according to the present invention.

The afocal optical system 30 may be formed by only the zoom lens 32 as shown in FIG. 19. In this case, the photosensitive material FM must be disposed at the image plane FP2 of the zoom lens 32.

Although the preceding embodiments require that the image plane of the zoom lens (afocal system) 32 coincides with the front focal plane of the lens L10 of the afocal optical system 34 to form the optical system 30 so that the optical system 30 becomes afocal, the respective optical system forming the afocal optical system 30 (the lens 32 in the first preferred embodiment and the optical system 34 in the second preferred embodiment) needs not be afocal. That is, it is only necessary that the optical system 30 is afocal as a whole.

(5) Fifth Preferred Embodiment

Figure 20:
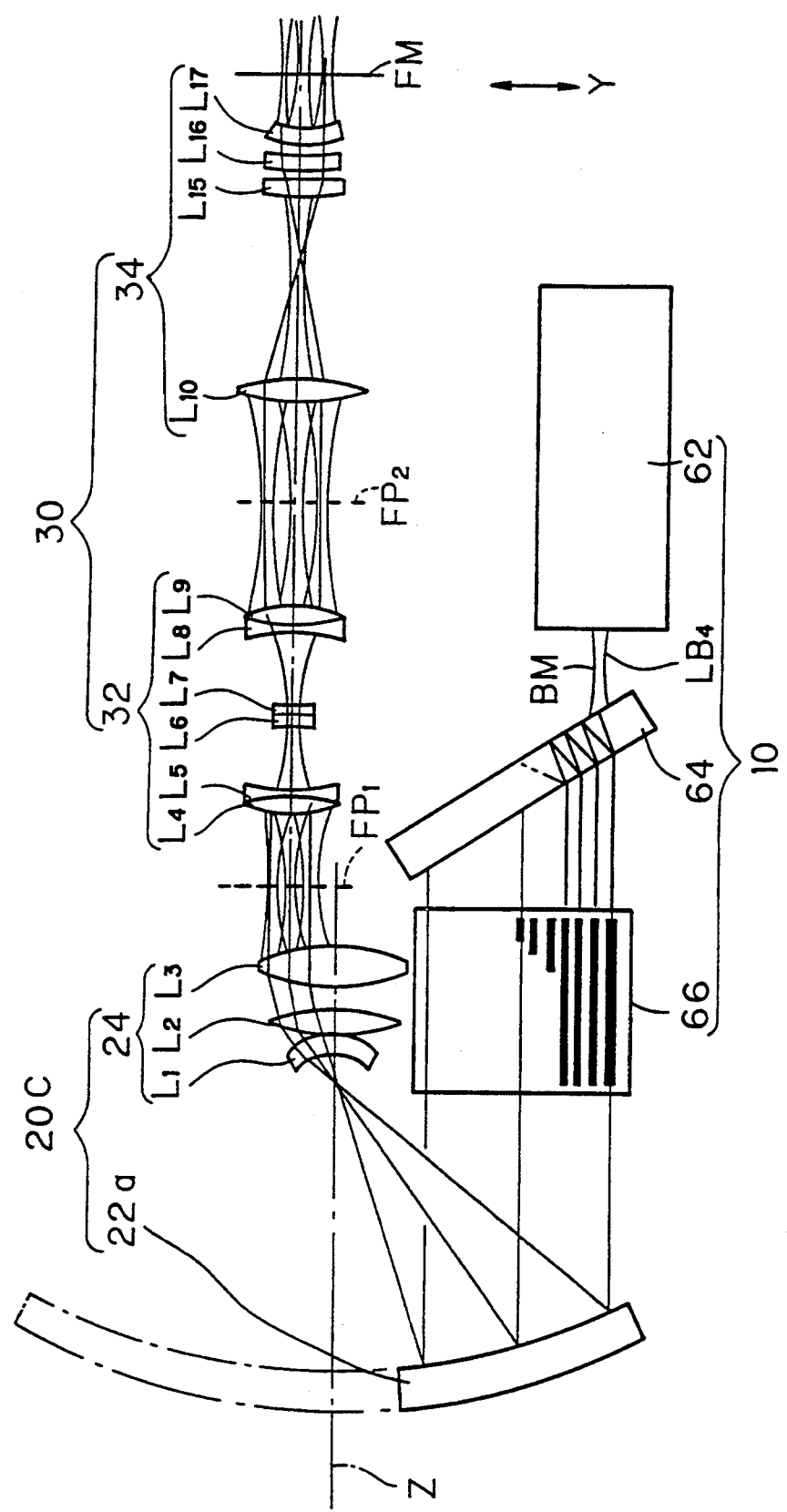
FIG. 20 is a diagram of a multibeam recording apparatus according to a fifth preferred embodiment of the present invention.

FIG. 20 is a diagram of a multibeam recording apparatus according to a fifth preferred embodiment of the present invention. The fifth preferred embodiment is different from the first preferred embodiment regarding the light source unit 10 but is otherwise generally the same as the first preferred embodiment. Hence, only the light source unit 10 will be described in terms of structure and the other structures will be omitted.

In the light source unit 10, a solid laser 62 is used as a laser beam source instead of the semiconductor laser 12. One laser beam LB4 from the solid laser beam 62 is allowed into a beam splitter 64 where it is divided into a plurality of laser beams. The divided laser beams enters a multi-channel modulator 66 where they are modulated each in accordance with an image signal. The laser beams are then omitted from the light source unit 10 toward the reduction afocal optical system 20C. A gas and other suitable laser may replace the solid laser 62.

In this embodiment, as shown in FIG. 20, beam waists BW are formed at a position which corresponds to where the apertures 18 of the first preferred embodiment are located. Hence, the beam waists of the divided laser beams are located at the planes FP1 and FP2 and on the photosensitive material FM (recording surface), promising a sharp image to be recorded on the photosensitive material FM. Of course, the effects of the fourth preferred embodiment remain the same since the reduction afocal optical system 20C and the optical system 30 remain unchanged regarding structure.

When the beam splitter 64 is used, the beam waists of the divided laser beams are formed at different positions in different channels, and the differences of the waist-forming positions are determined by a vertical magnification of the optical system as a whole. Since this type of recording apparatus in most cases has a large reduction to perform high density image drawing, however, the differences of the waist-forming positions are extremely small and therefore negligible in practical use.

(6) Sixth Preferred Embodiment

Although the foregoing has described such an apparatus for recording an image on the photosensitive material FM which is wound around the rotation cylinder 40; the present invention is applicable to an apparatus which records an image on a photosensitive material FM which is carried on the inner surface of a cylinder.

Figure 21:
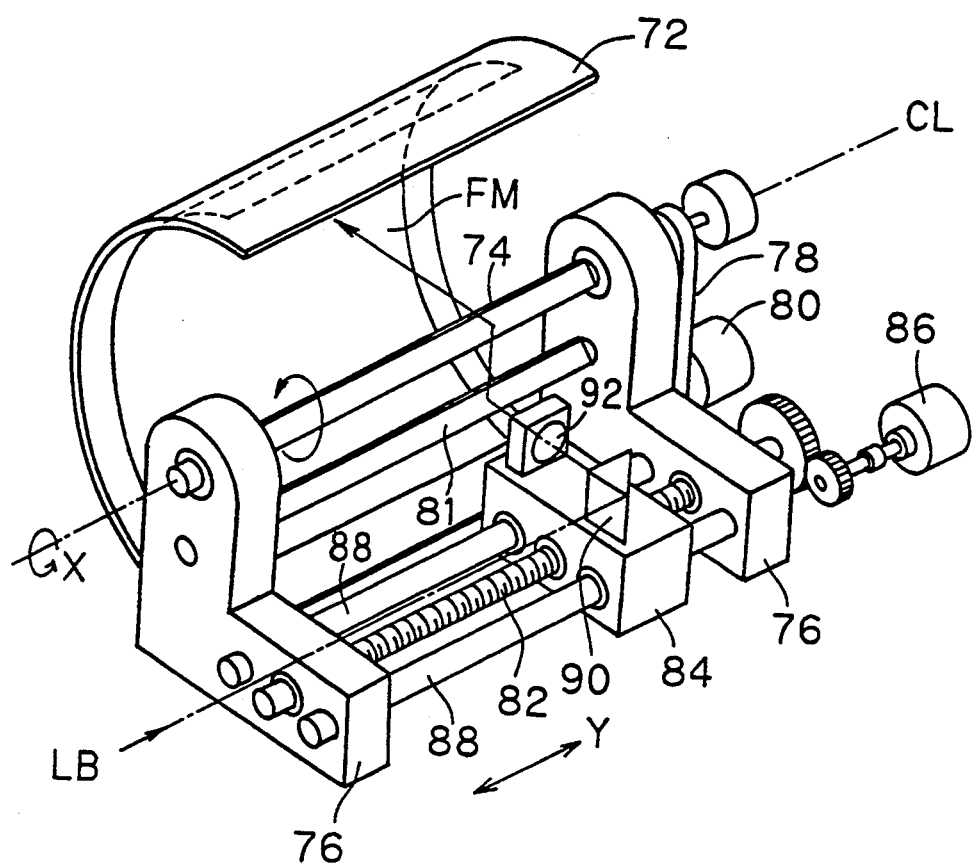
FIG. 21 is a diagram of a multibeam recording apparatus according to a sixth preferred embodiment of the present invention.

FIG. 21 is a perspective view of a scanning part of this type of multibeam recording apparatus. In FIG. 21, a photosensitive material FM is carried by the inner surface of a holder 72 which resembles a hollow cylinder which is divided parallel to its axis. On the center line of curvature CL of the holder 72, a rotation mirror 74 having a reflective surface which is parallel to the center line CL is supported by a pair of frames 76 and 76 for free rotation. Connected to a motor 80 via a belt 78, the rotation mirror 74 rotates when driven by the motor 80. Below the rotation mirror 74, a stationary mirror 81 is fixed to the frames 76 and 76.

A ball screw 82 runs across the frames 76 and 76 and a beam head 84 is engaged with the ball screw 82. When a motor 86 rotates which is linked to an end of the ball screw 82, the beam head 84 slides in the sub scanning direction Y while guided by guides 88 and 88.

A rectangular prism 90 is mounted on the beam head 84. A plurality of laser beams LB originating from the light source unit 11) strike, through the reduction afocal optical system 20A and the afocal optical system 30, the rectangular prism 90 where they are reflected toward a converging lens 92 which is mounted on the beam head 84. Laser beams from the converging lens 92 are irradiated on the photosensitive material FM through the station mirror 78 and the rotation mirror 74.

Thus, when laser beams from the afocal optical system 30 are scanned in the primary scanning direction X by driving the motor 80 and rotating the rotation mirror 74 while the beam head 84 is moved in the sub scanning direction Y by driving the motor 86, a desired image is recorded on the photosensitive material FM.

(7) Seventh Preferred Embodiment

Figure 22:
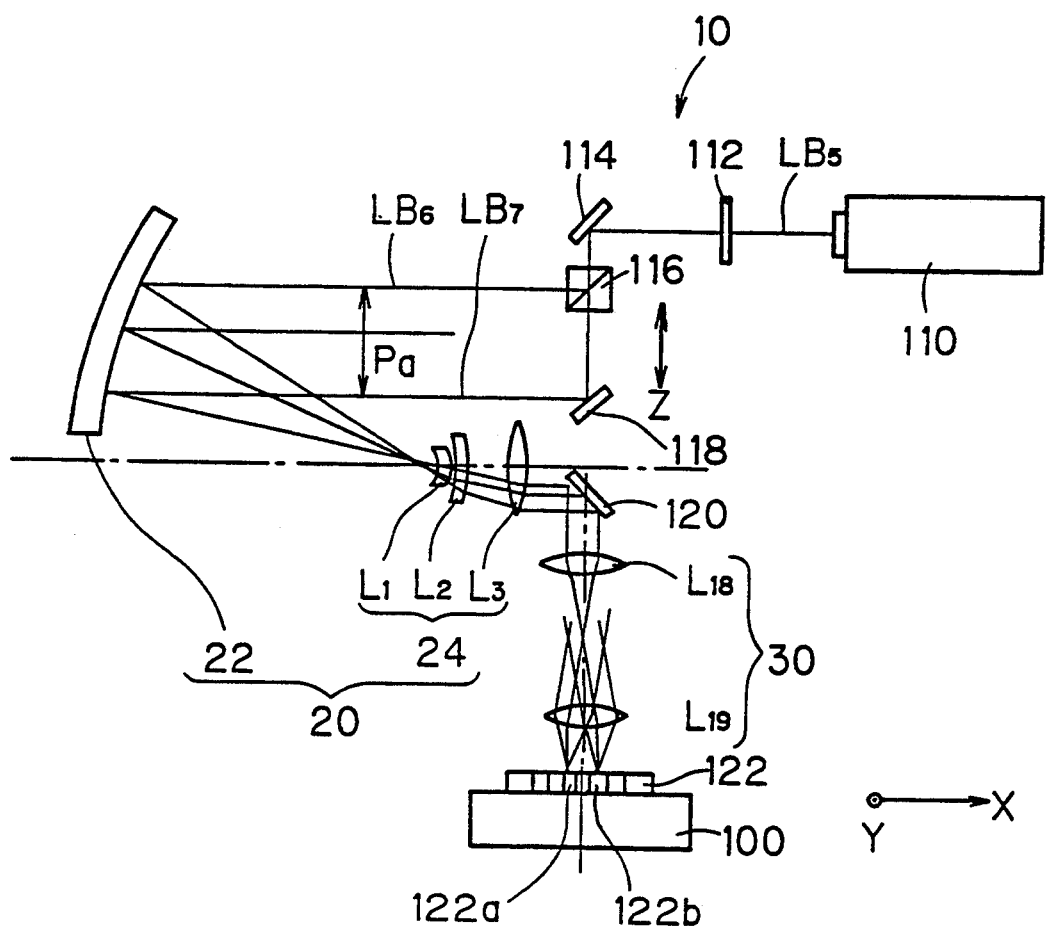
FIG. 22 is a diagram of a multibeam recording apparatus according to a seventh preferred embodiment of the present invention.

FIG. 22 is a diagram of a multibeam recording apparatus according to a seventh preferred embodiment of the present invention. The multibeam recording apparatus comprises the light source unit 10 for emitting two laser beams, the reduction afocal optical system 20C which is formed by the off-axis paraboroid mirror 22a and the stereographic projection lens 24, the afocal optical system 30 which is formed by two lenses L18 and L19, and an XY stage 100 for mounting and two-dimensionally registering a target object 122.

In the light source unit 10, a laser beam LB5 from an argon laser 110 impinges on a beam splitter 116 through a shutter 112 and a reflecting mirror 114. Some components of the laser beam LB5 are reflected by the beam splitter 116 and the remaining components of the laser beam LB5 are transmitted by the beam splitter 116 and reflected by a mirror 118. Thus, in the light source unit 10, one laser beam LB5 is divided into two parallel laser beams LB6 an LB7 which will be emitted toward the reduction afocal optical system 20C. Although not shown in FIG. 22, the beam splitter 116 and the mirror 118 are linked to a drive mechanism so that the beam splitter 116 and the mirror 118 are individually movable in a direction Z in which the laser beam LB5 propagates. By adjusting a distance between the beam splitter 116 and the mirror 118, the beam pitch Pa of the laser beams LB6 and LB7 from the light source unit 10 is changed.

The laser beams LB6 and LB7 from the light source unit 10 are focused through the reduction afocal optical system 20C as intermediate images at a predetermined position and then reflected by a reflection mirror 120 to be advanced to the afocal optical system 30. The intermediate images are then reduced by the afocal optical system 30 at a proper magnification and imaged on the target object 122 which is placed on the XY stage 100. The multibeam recording apparatus is capable of recording images on, for example, regions 122a and 122b of the target object 122 at a predetermined pitch at the same time. Although the foregoing has described that the preceding embodiments use a laser such as the semiconductor laser 14 and the solid laser 62 as a light source for emitting a light beam, an LED may be used as such.

B-2. Laser Beam Expander

Figure 1:
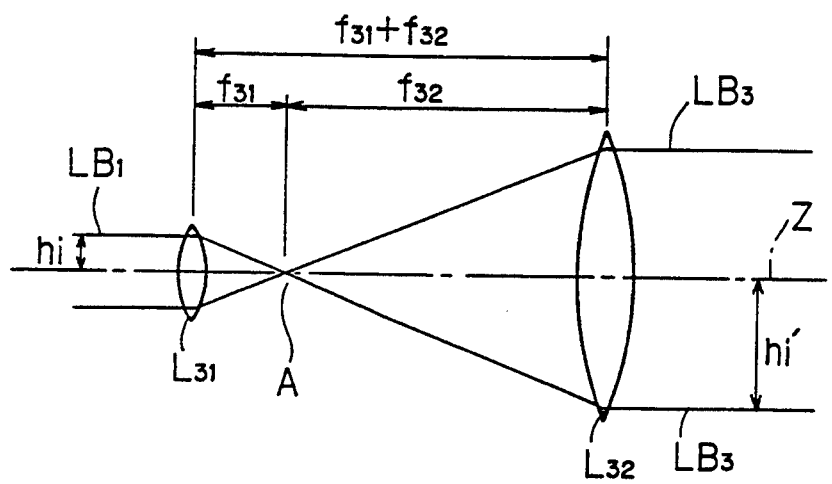
FIG. 1 is a diagram of a conventional afocal optical system.
Figure 2:
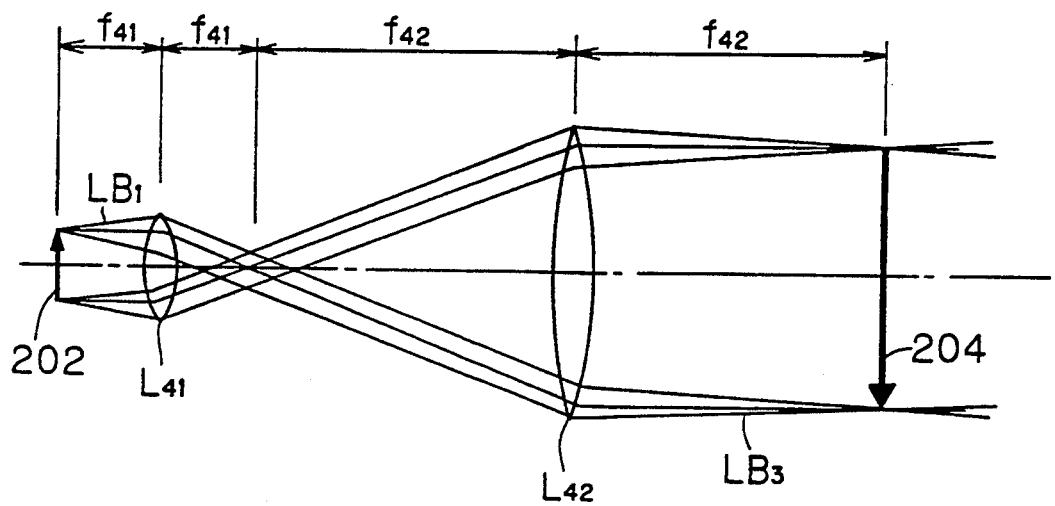
FIG. 2 is a diagram showing other example of the conventional afocal optical system.
Figure 3:
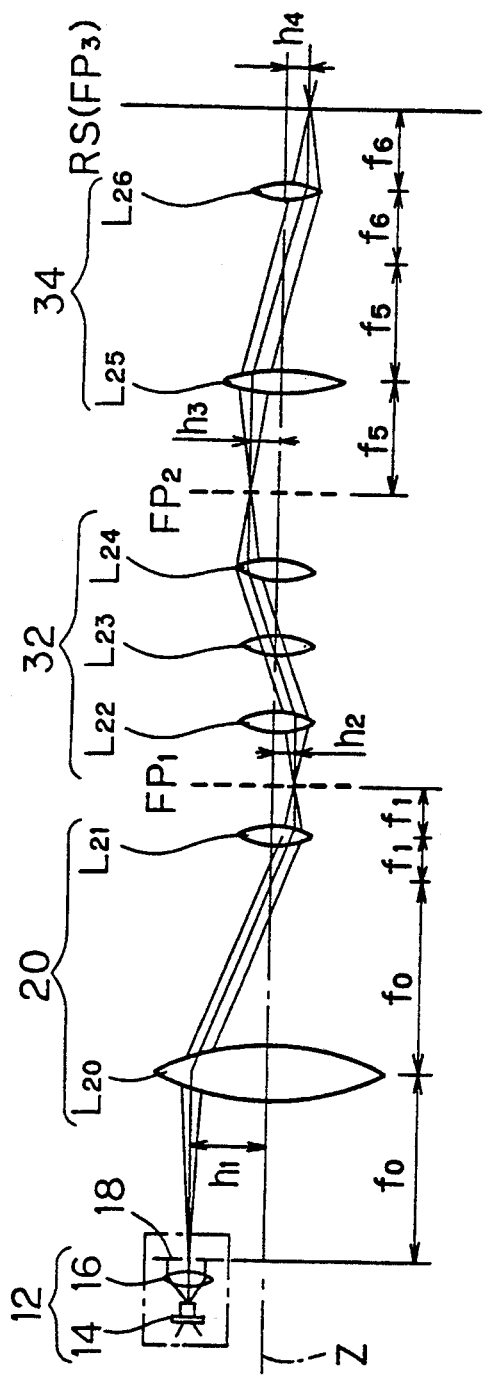
FIG. 3 is a diagram of a conventional multibeam recording apparatus.
Figure 23:
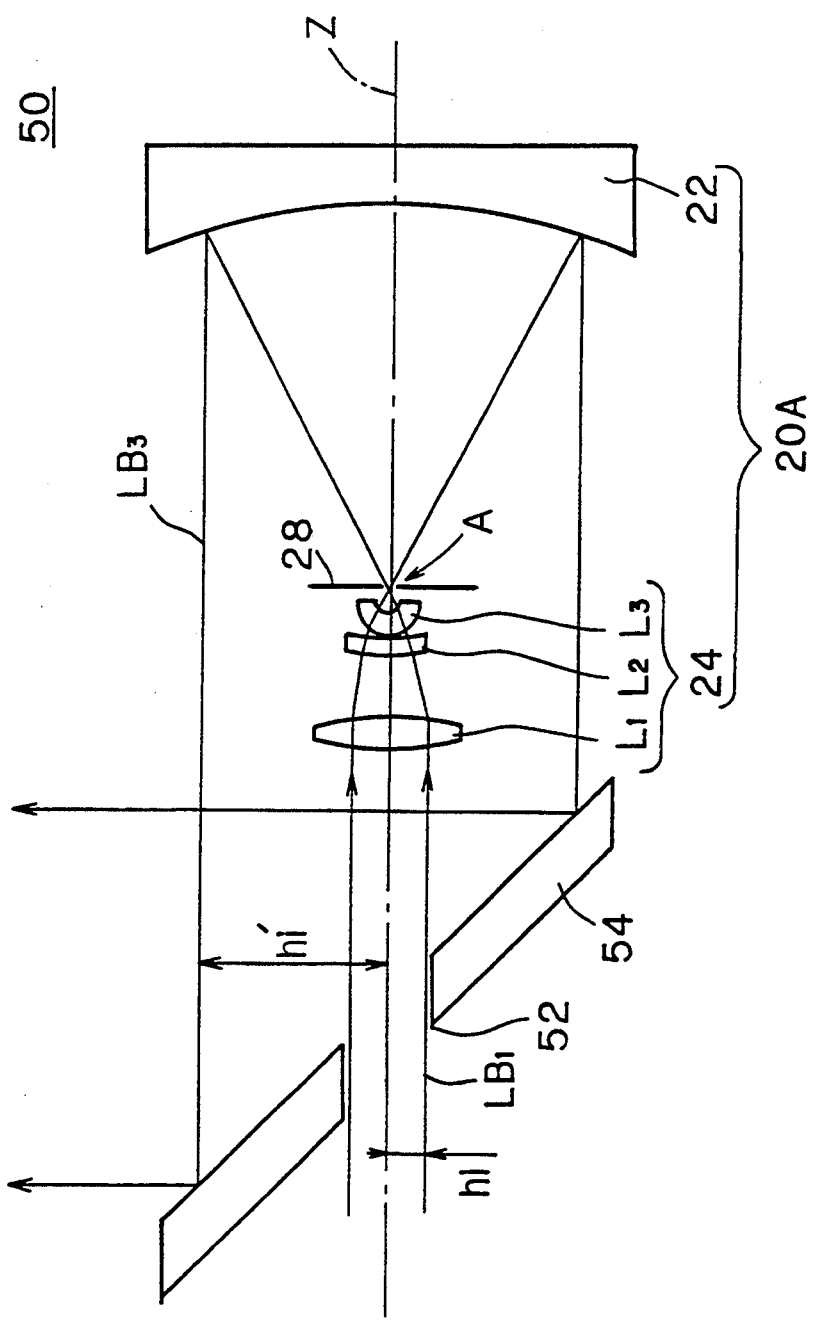
FIG. 23 is a diagram of a laser beam expander comprising the afocal optical system of the present invention.

FIG. 23 is a diagram of a laser beam expander comprising the afocal optical system 20A of FIG. 4. In FIG. 23, the laser beam expander 50 is formed by the afocal optical system 20A and a reflecting mirror 54 which has an aperture 52 in the center. A light beam LB1 from a light source (not shown) travelling parallel to the optical axis Z passes through the aperture 52 of the mirror 54 and enters the afocal optical system 20A. As a result, a light beam LB3 comes out of the afocal optical system 20A parallel to the optical axis Z while satisfying Eq. 4 as described earlier. The light beam LB3 is then reflected by the reflecting mirror 54 which is oriented at a certain angle (e.g., 45 degrees) to the optical axis Z and directed perpendicular to the direction of the incident light. Hence, the beam diameter of the light beam LB3 is expanded in accordance with the magnification of the afocal optical system 20A (=f22/f24; f22>f24). Thus, a laser beam expander is obtained which produces a light beam of a larger diameter without inviting the problems which are inherent in the conventional technique (FIG. 1).

In addition, in the embodiment shown in FIG. 23, a stop 28 is interposed at the point A where the focal points of the paraboroid mirror 22 and the stereographic projection lens 24 coincide with each other. Though not essential to the laser beam expander 50, disposed at the point A which corresponds to the entrance pupil of the stereographic projection lens 24, the stop 28 serves as a spatial filter. The intensity of light beam LB1 applied to the laser beam expander 50 usually has a Gaussian distribution. In some cases, a noise component is included in the light beam LB1. Disposed at the focal point of the stereographic projection lens 24, the stop 28 cuts noise component.

Although the laser beam expander of FIG. 23 comprises the afocal optical system 20A, any one of the afocal optical systems 20B to 20E described the above may be used instead.

The optical apparatus above serves as a laser beam compressor if constructed to have an opposite optical path in which the light beam LB1 impinges in an opposite manner.

B-3. Image Input Apparatus

Figure 24:
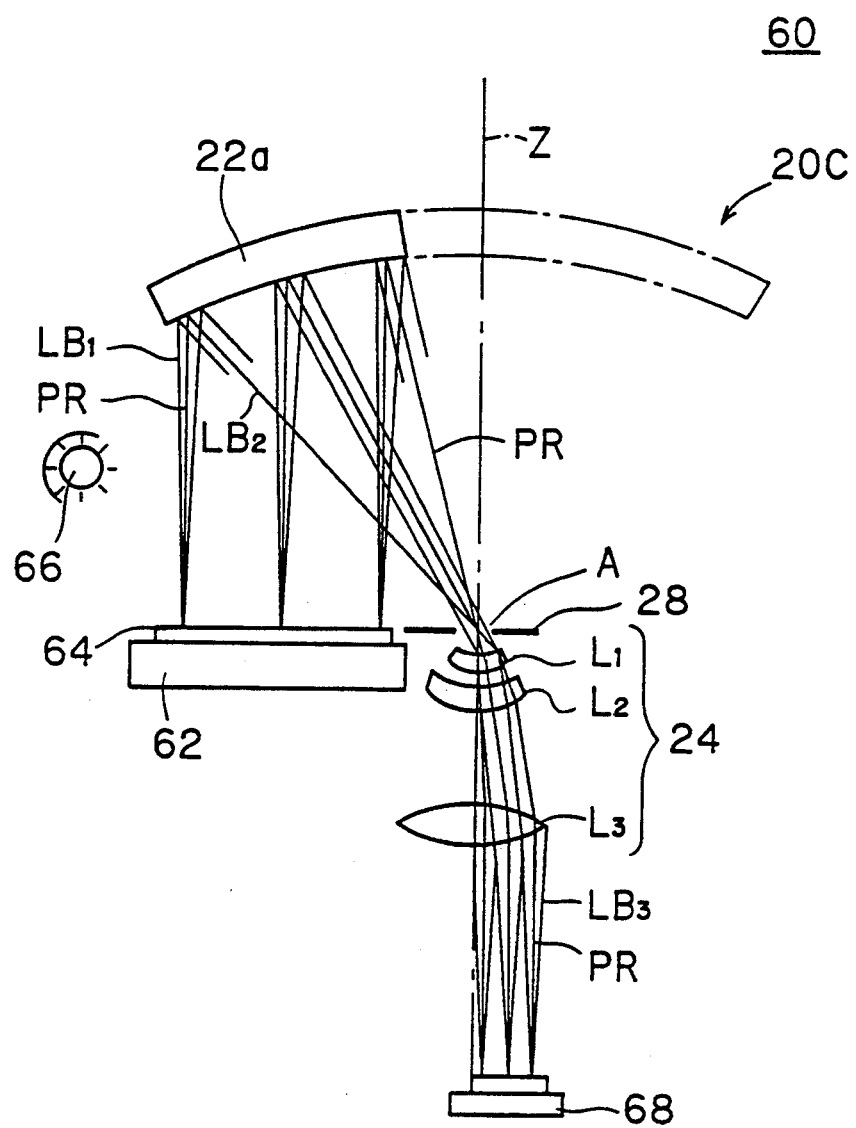
FIG. 24 is a diagram of an image input apparatus comprising the afocal optical system of the present invention.

FIG. 24 is a diagram of an image input apparatus comprising the afocal optical system 20C of FIG. 6. The image input apparatus 60 comprises a lamp 66 for illuminating an original 64 which is placed on a table 62. The original 64 is approximately evenly illuminated with light from the, lamp 66.

Comprising the afocal optical system 20C of FIG. 6, the image input apparatus 60 is telecentric on both the object side (original 64 side) and the image side (image input &vice side), i.e., a both-side telecentric optical system. When the lamp 66 is turned on, a light beam LB1 originating from the original 64 impinges on the off-axis paraboroid mirror 22a. A light beam LB2 reflected by the off-axis paraboroid mirror 22a passes through the stop 28 to be allowed to the stereographic projection lens 24 which images the light beam LB2 on an image input device 68 such as CCD element. The image and other information of the original 64 are thus read by the image input device 68.

In this embodiment, it is the stop 28 that enhances the telecentric quality of the afocal optical system 20C. That is, due to the stop 28, principal rays PR of the light from the original 64 cross the optical axis Z at the point A, or the entrance pupil of the stereographic projection lens 24, whereby the principal rays PR included in the light beam LB3 from the stereographic projection lens 24 all become parallel to the optical axis Z, i.e., perpendicular to the image input device 68 at every image height. In addition, since the stop position A is the focal point of the off-axis paraboroid mirror 22a, principal rays PR included in the light beam LB1 from the original 64 become perpendicular to the surface of the original and parallel to the optical axis Z at any position on the surface of the original.

As described above, the image input apparats 60, comprising the afocal optical system 20C (though the light propagates in an opposite direction to that shown in FIG. 6), images light from the original 64 on the image input device 68 while always satisfying Eq. 7. In addition, the image input apparats 60 is telecentric on both the image and the object sides. Since this allows that the data of the original is inputted in a telecentric condition, even if there is an inconvenience regarding the original 64, e.g., the original 64 rises from the table 62, a dimensional error would not be easily created. In addition, although the image input device 68 is equipped with an optical window (not shown) in most cases, since the image input apparats 60 is telecentric on the image side (image input device 68 side), only light from upright direction is allowed into the image input device 68, thereby preventing aberration which is created by light incident upon the optical window at an angle and hence improving the efficiency of data input of the original.

The afocal optical system 20C may be replaced with any one of the afocal optical systems 20A, 20B, 20D and 20E of the other preferred embodiments.

B-4. Reduction Projection Apparatus

Figure 25:
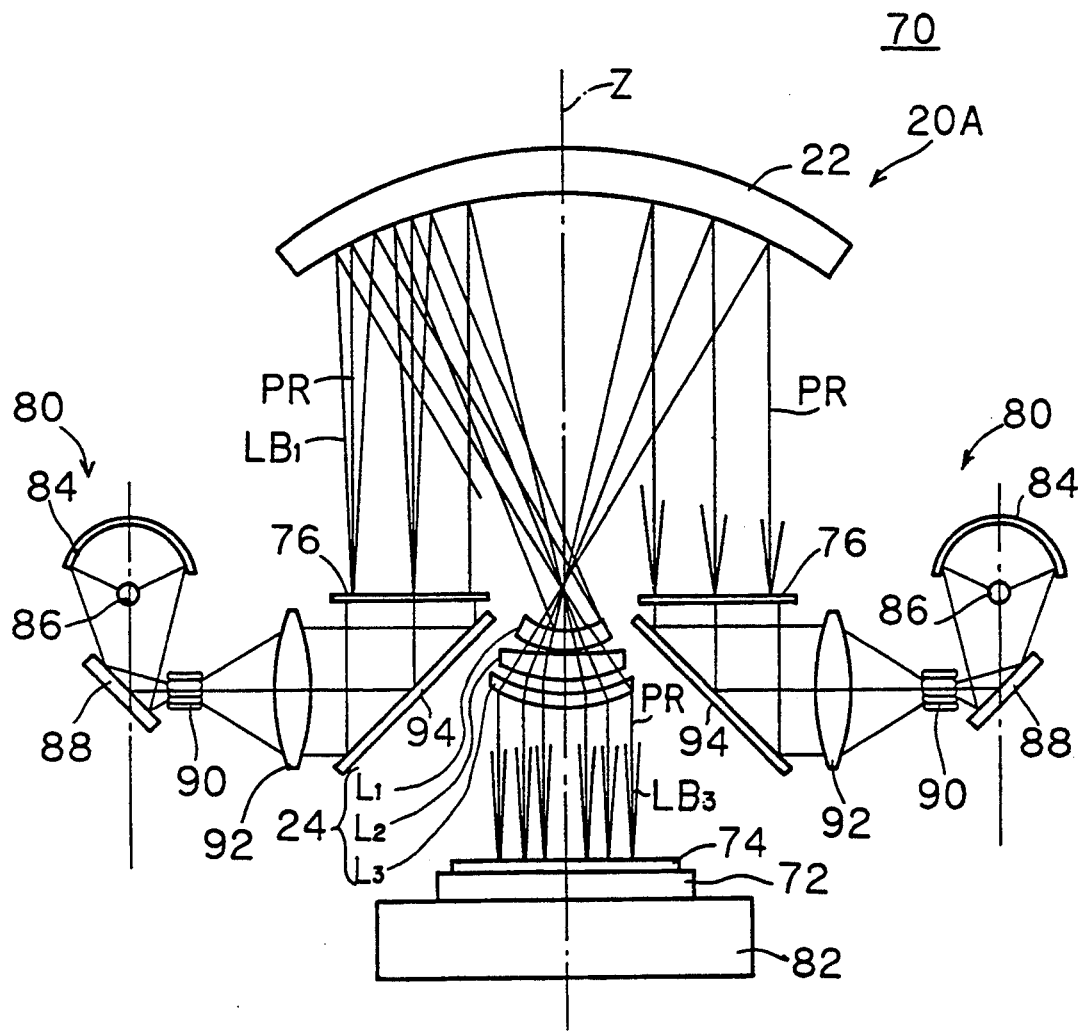
FIG. 25 is a diagram of a reduction projection apparatus comprising the afocal optical system of the present invention.

FIG. 25 is a diagram of a reduction projection apparatus comprising the afocal optical system 20A of FIG. 4. The reduction projection apparatus 70 is an apparatus for reducing the images of reticles 76 and transferring the images once at a time onto a resist film 74 which is formed on a silicon substrate 72. The reduction projection apparatus 70 is comprised of illumination optical systems 80 for irradiating the reticles 76 from the back surfaces of the reticles 76, the afocal optical system 20A of FIG. 4, and a stage 82 for mounting the silicon substrate 72.

In each illumination optical system 80, a light beam from a lamp 86 which is equipped with an elliptical mirror 84 impinges on a fly-eye lens 90 through a cold mirror 88. A light beam from the fly-eye lens 90 enters a collimating lens 92 where it is collimated to become a parallel light beam which will be then reflected by a mirror 94 back onto the back surfaces of the reticles 76. A light beam transmitted by the reticles 76 is imaged on the resist film 74 by the afocal optical system 20A. The images of the reticles are thus transferred onto the resist film 74.

As described above, the images of the reticles are transferred onto the resist film 74 using the afocal optical system 20A which is telecentric on both the image and the object sides. Hence, even though the reticles 76 and the resist film 74 include a deficiency such as a partially risen portion or a warped portion, the reticle images are transferred at a relatively good accuracy.

Figure 26:
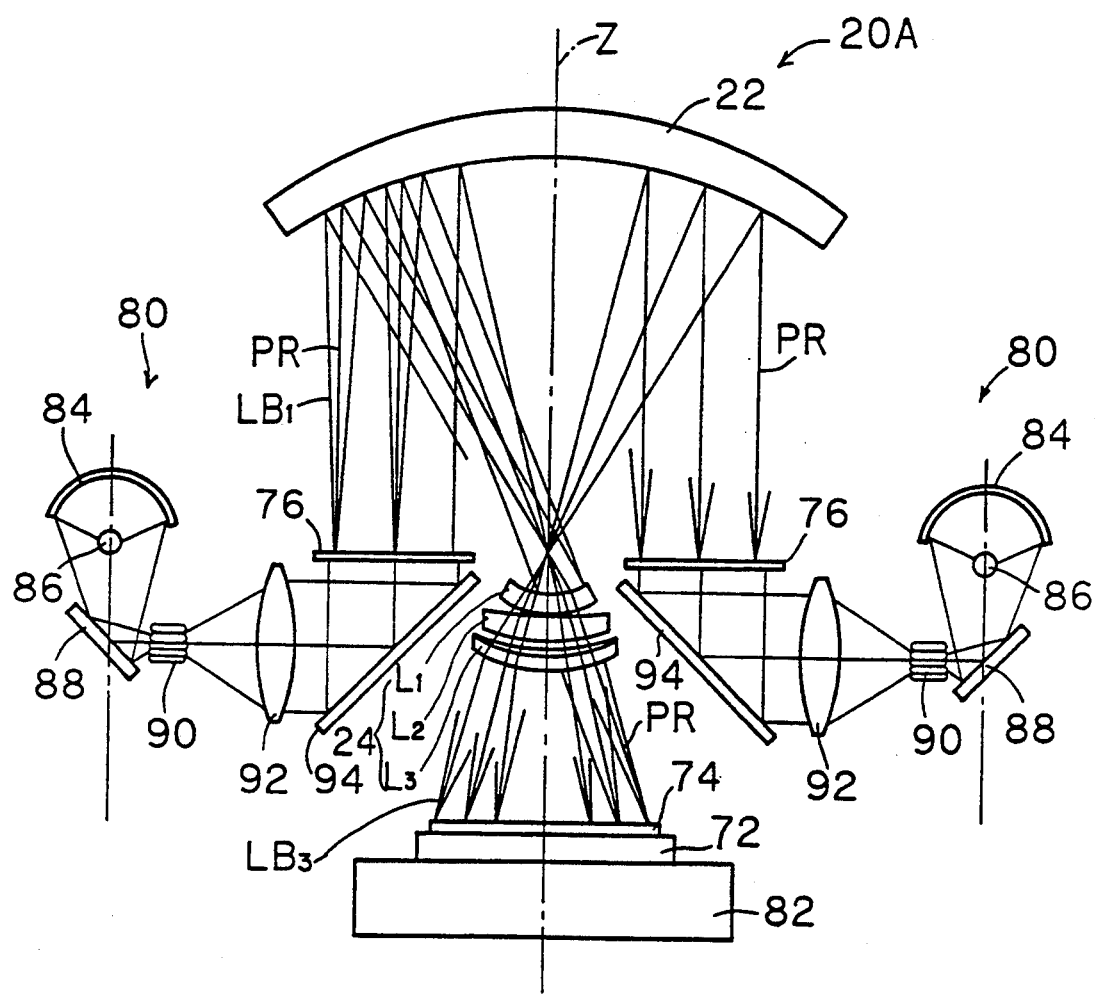
FIG. 26 is a diagram showing other example of the reduction projection apparatus comprising the afocal optical system of the present invention.

If resolution is not an issue, the optical system may be telecentric only on the object side (reticle 76 side) as shown in FIG. 26 as far as the height hi' at the resist film 74 and the height hi on the object side satisfy Eq. 4. In such a case, since the optical system is not telecentric on the imaging side (resist film 74 side), it is possible to transfer larger reticle images onto the resist film 74 if at a little degraded transfer accuracy when the reticles and the resist film include a deficiency such as a partially risen portion and a warped portion.

Although the foregoing is related to where the images of the two reticles 76 are transferred onto the resist film 74 once at a time, three or more reticles 76 may be transferred at the same time. Further, instead of the afocal optical system 20A, any one of the afocal optical systems 20C, 20D and 20E of the third, the fourth and the fifth preferred embodiments to transfer the image of one reticle 76.

B-5. Expansion Projector

Figure 27:
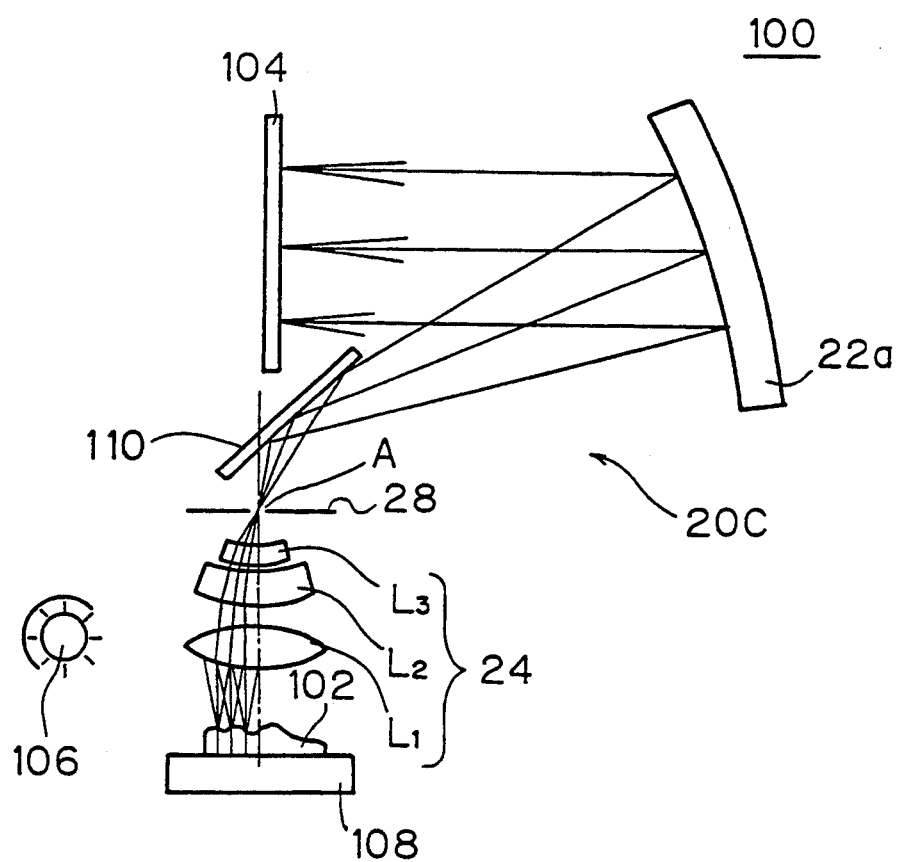
FIG. 27 is a diagram of an expansion projector comprising the afocal optical system of the present invention.

FIG. 27 is a diagram of an expansion projector comprising the afocal optical system 20C of the third preferred embodiment. Constructed as an apparatus for expanding the image of a target object 102 and projecting the image on a screen 104, the expansion projector 100 comprises a lamp 106 for illuminating the target object 102, a stage 108 and the afocal optical system 20C.

The afocal optical system 20C is similar to the afocal optical system of FIG. 6 except for provision of a reflecting mirror 110. Hence, when the lamp 106 is turned on, a light beam from the target object 102 is imaged on the back surface of the screen 104 through the afocal optical system 20C, allowing that the expanded image of the target object 102 is observed from the front surface of the screen 104.

Since also in this embodiment a stop 28 is disposed at the point A where the focal points of the paraboroid mirror 22 and the stereographic projection lens 24 coincide with each other, principal rays included in a light beam from the target object 102 advance perpendicular to the target object 102 and principal rays included in a light beam from the off-axis paraboroid mirror 22a advance perpendicular to the screen 104, i.e., the expansion projector is telecentric on both the image and the object sides, the reason being the same as that described before. Hence, the expanded image of the target object 102 is observed at a high resolution.

B-6. Illumination Apparatus

Figure 28:
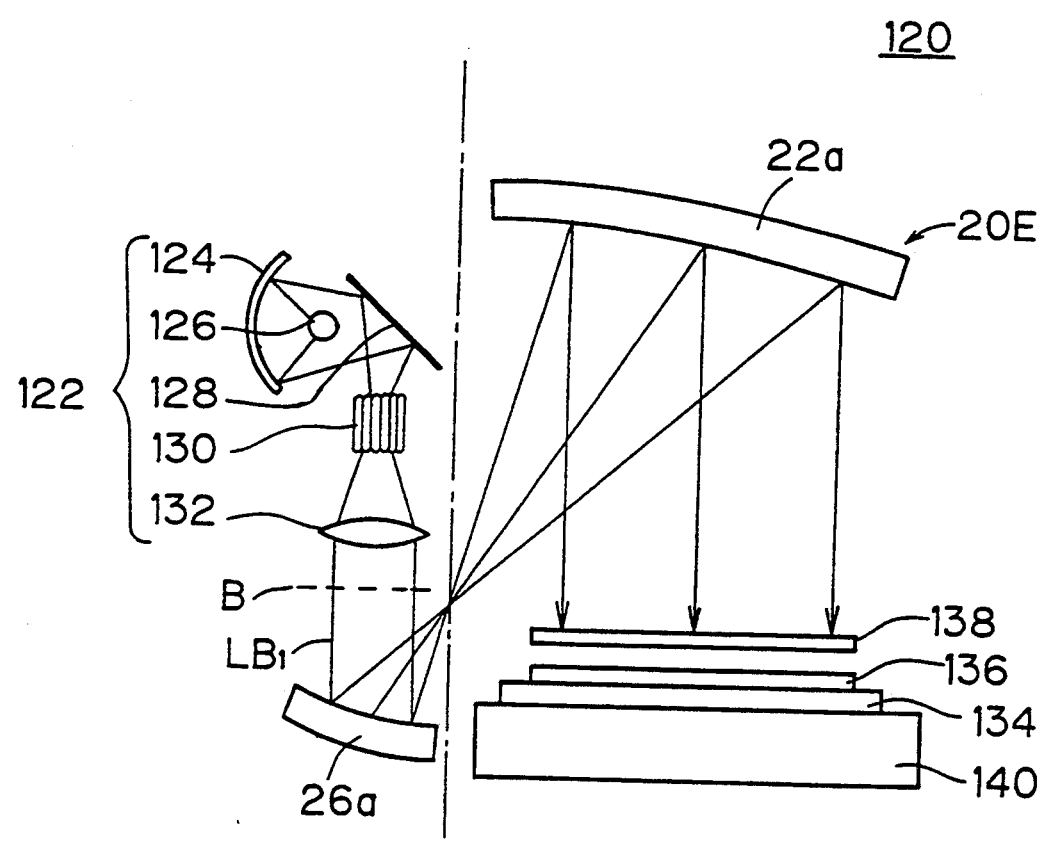
FIG. 28 is a diagram of an illumination apparatus comprising the afocal optical system of the present invention.

FIG. 28 is a diagram of an illumination apparatus comprising the afocal optical system 20E. The illumination apparatus 120, intended to be used in a proximity exposure apparatus, comprises a light source unit 122 and the afocal optical system 20E which is formed by two off-axis paraboroid mirrors 22a and 26a.

The light source unit 122 includes a lamp 126 which has an elliptical mirror 124. A light beam from the lamp 126 impinges on a fly-eye lens 130 through a cold mirror 128. A light beam from the fly-eye lens 130 enters a collimating lens 132 where it is collimated into a parallel light beam LB1. Hence, an imaginary plane B immediately below the collimating lens 132 is irradiated by the parallel light beam which has even intensity distribution.

Since the afocal optical system 20E is identical to the afocal optical system of FIG. 8 described earlier, the parallel light beam LB1 from the light source unit 122 is expanded by the afocal optical system 20E which satisfies:

$$hi' = m5 \cdot hi$$

where m5=f22a/f26a; f22a is a focal length of the off-axis paraboroid mirror 22a; f26a is a focal length of the off-axis paraboroid mirror 26a; and m5 is a magnification of the afocal optical system 20E. Expanded in such a manner, the parallel light beam LB1 is irradiated parallel to the optical axis Z onto a surface-to-be-illuminated (e.g., a mask plate 138 placed immediately above a resist film 136 disposed on a glass 134 if the illumination apparatus 120 is used in a proximity exposure apparatus). In FIG. 28, indicated at numerical reference 140 is a table for mounting the glass 134.

As described above, since the illumination apparatus 120 uses the afocal optical system 20E which is comprised of the two off-axis paraboroid mirrors 22a and 26a, light is irradiated onto the surface-to-be-illuminated perpendicular thereto with uniform illumination distribution. Further, by properly combining the focal lengths of the off-axis paraboroid mirrors 22a and 26a and changing the magnification m5 of the afocal optical system 20E, an illumination area is adjusted as desired.

While the invention has been described in detail, the foregoing description is in all aspects illustrative and not restrictive. It is understood that numerous other modifications and variations can be devised without departing from the scope of the invention.

What is claimed is:

1. An afocal optical system having an optical axis, comprising:

a first paraboroid mirror, disposed on the optical axis, having a finite focal length; and an optical element, disposed on the optical axis, having a stereographic projection characteristics which is defined by the following equation:

$$hi' = 2 \cdot f \cdot \tan(\theta i/2)$$

where hi' is a height of a light beam, leaving said optical element, taken from the optical axis or a heigh of an image taken from the optical axis, f is a focal length of said optical element and $\theta i$ is an angle of incidence with respect to said optical element, the focal point of said optical element substantially coinciding with that of said first paraboroid mirror.

2. An afocal optical system of claim 1, wherein said optical element is a second paraboroid mirror.

3. An afocal optical system of claim 2, wherein at least one of said first and second paraboroid mirrors is an off-axis paraboroid mirror.

4. An afocal optical system of claim 1, wherein said optical element is a stereographic projection lens.

5. An afocal optical system of claim 4, wherein said first paraboroid mirror is a off-axis paraboroid mirror.

6. An afocal optical system of claim 1, further comprising an aperture stop disposed at a point where the focal points of said first paraboroid mirror and said optical element coincide with each other.

7. A multibeam recording apparatus for recording an image on a recording surface, comprising:

a light source unit for emitting a plurality of light beams; and a reduction afocal optical system for directing said light beams from said light source unit toward said recording surface, said reduction afocal optical system having an optical axis, wherein said reduction afocal optical system comprises a first paraboroid mirror, disposed on the optical axis, having a first finite focal length; and an optical element, disposed on the optical axis, having a stereographic projection characteristics which is defined by the following equation:

$$hi' = 2 \cdot f \cdot \tan(\theta i/2)$$

where hi' is a height of a light beam, leaving said optical element, taken from the optical axis or a height of an image taken from the optical axis, f is a second finite focal length of said optical element and $\theta i$ is an angle of incidence with respect to said optical element; and wherein the focal point of said optical element substantially coincides with that of said first paraboroid mirror.

8. A multibeam recording apparatus of claim 7, wherein said optical element is a second paraboroid mirror, and wherein the first and second finite focal lengths are different from each other.

9. A multibeam recording apparatus of claim 7, wherein said optical element is a stereographic projection lens, and wherein the first and second finite focal lengths are different from each other.

10. A multibeam recording apparatus of claim 7, further comprising an afocal optical system having an optical axis disposed between said reduction afocal optical system and said recording surface, wherein the optical axis of said afocal optical system is parallel to and displaced from the optical axis of said reduction afocal optical system.

* * * * *